United States Patent
Fujishima et al.

(10) Patent No.: US 7,099,736 B2
(45) Date of Patent: Aug. 29, 2006

(54) OPERATION MANAGEMENT SYSTEM

(75) Inventors: Makoto Fujishima, Yamatokoriyama (JP); Masahiro Komatsu, Yamatokoriyama (JP); Akio Karyu, Yamatokoriyama (JP); Kingo Maeda, Yamatokoriyama (JP); Yuichi Nakazawa, Yamatokoriyama (JP); Shizuo Nishikawa, Yamatokoriyama (JP)

(73) Assignee: Mori Seiki Co., Ltd., Nara (JP)

( * ) Notice: Subject to any disclaimer, the term of this patent is extended or adjusted under 35 U.S.C. 154(b) by 0 days.

(21) Appl. No.: 10/546,118

(22) PCT Filed: Feb. 20, 2004

(86) PCT No.: PCT/JP2004/002034

§ 371 (c)(1),
(2), (4) Date: Aug. 19, 2005

(87) PCT Pub. No.: WO2004/077184

PCT Pub. Date: Sep. 10, 2004

(65) Prior Publication Data

US 2006/0149412 A1    Jul. 6, 2006

(30) Foreign Application Priority Data

Feb. 28, 2003  (JP) ............................. 2003-053453
Mar. 6, 2003   (JP) ............................. 2003-059570

(51) Int. Cl.
*G06F 19/00*  (2006.01)
*G06F 11/30*  (2006.01)
*G06F 15/16*  (2006.01)
*G21C 17/00*  (2006.01)

(52) U.S. Cl. ..................... 700/169; 700/174; 700/177; 700/111; 702/182; 702/188; 709/200

(58) Field of Classification Search ................ 700/9, 700/79, 80, 81, 83, 111, 169, 174, 177, 182, 700/201, 204; 702/182–185, 188; 715/700, 715/961, 965; 709/200
See application file for complete search history.

(56) References Cited

U.S. PATENT DOCUMENTS 3,882,305 A * 5/1975 Johnstone .................... 702/183
5,825,361 A * 10/1998 Rubin et al. ................. 715/839

(Continued)

FOREIGN PATENT DOCUMENTS

EP   1162524 A2   12/2001
JP   H11-154174 A   6/1999

(Continued)

*Primary Examiner*—Leo Picard
*Assistant Examiner*—Sean Shechtman
(74) *Attorney, Agent, or Firm*—James W. Judge

(57) ABSTRACT

Operational administration system enabling reduction in expense burden on user, and permitting manufacturer to comprehend accurately and timely operational status of machine tools on user end. Operational administration system (1) includes, interconnected via Internet (5): manufacturer-end administration device (20); operational data storage/transmission devices (10) connected to numerical controllers for NC machine tools (15); and user-end terminal device (30). The operational data storage/transmission devices (10) gather from the numerical controllers data pertaining to the operational status of the NC machine tools (15), store the data and, when specified transmission conditions are met, send the stored operational status data to administration device (20) in an e-mail data format. With the received operational status data, administration device (20) updates operational status data it stores, and sends to terminal device (30), in response to a request therefrom, machine-tool operational status data identified by user ID information appropriately input through terminal device (30).

8 Claims, 18 Drawing Sheets

U.S. PATENT DOCUMENTS

| | | | |
|---|---|---|---|
| 6,336,053 B1 * | 1/2002 | Beatty | 700/108 |
| 6,836,698 B1 * | 12/2004 | Fujishima et al. | 700/169 |
| 2002/0013639 A1 | 1/2002 | Seiki | |

FOREIGN PATENT DOCUMENTS

| | | |
|---|---|---|
| JP | 2001-350510 A | 12/2001 |
| JP | 2002-268721 A | 9/2002 |

\* cited by examiner

FIG. 4

| Name of Table | Fields |
|---|---|
| Operational status A | cumulative power-on time / cumulative operating time / cumulative alarm sounding time / cumulative cutting time / cumulative spindle rotating time / cumulative manual mode time / cumulative coolant spraying time |
| Operational status B | machine status / O number of machining in progress / sequence number / operating mode / single block flag / optional stop flag / block delete flag / dry run flag / coolant ON flag / rapid feed override |
| Operational status C | machine status / date and time of the start of that status (=date and time of the end of the previous status) / O number at the time of that status |
| Machining Results | date and time of the start of machining / date and time of the end of machining / O number |
| Alarm Log | date and time the alarm sounded / alarm number / alarm message / O number when the alarm sounded |
| Other | machine number / user code / contact information |

| Field | Tag |
|---|---|
| Machine number | <SERIAL_NUMBER> |
| User code | <USER_CODE> |
| Contact | <CONTACT_ADD> |
| Operational status A, B | <M_MCNDTL> |
| Operational status C | <M_MCNSTS> |
| Machining Results | <M_MNFRSL> |
| Alarm History | <M_ALMHIS> |

*FIG. 13*

Header:
- Date: Fri, 22 Feb 2002 07:59:18
- Subject: * * * * * * * * *
- To: * * * *@* * * *.co.jp
- From: * * * *@* * * *.co.jp Body:
```
<SERIAL_NUMBER>
"NV5000"
</SERIAL_NUMBER>
<USER_CODE>
"1234567"
</USER_CODE>
<CONTACT_ADD>
"090-1234-5678"
</CONTACT_ADD>
<M_MCNDTL>
1,"O1000"," ",a,b,c,d,e,f,g,h,I,j,k,l,m,n,o,p,q
</M_MCNDTL>
<M_MCNSTS>
r,"O1000",3
s,"O0100",2
t
</M_MCNSTS>
<M_MNFRSL>
r,s,"O1000"
  </M_MNFRSL>
<M_ALMHIS>
"EX0230","Put in magazine auto-mode"
"O1000", u
</M_ALMHIS>
```

FIG. 15

| User ID information | Machine tool data | E-mail address |
|---|---|---|
| (User ID) ABC123<br>(Password) **** | Machine tool A<br>Machine tool B<br>Machine tool C | ABC@123.com |
| (User ID) DEF456<br>(Password) **** | Machine tool D | DEF@456.com |
| (User ID) GHI789<br>(Password) **** | Machine tool E<br>Machine tool F | GHI@789.com |

FIG. 18

| SH630 | | | | | | | |
|---|---|---|---|---|---|---|---|
| Date/Time of Alarm | Alarm No | Machine | Alarm Message | Part No | Order No | Production Gr. | Step No |
| 01/01/17 06:12:33 PM | 501 | SH630 | Overtravel: - | SH630 00542 | 01/01/17 | | 00542 |
| 01/01/17 06:03:40 PM | 500 | SH630 | Overtravel: + | SH630 05296 | 01/01/17 | | 05296 |
| 01/01/17 05:44:25 PM | 5010 | SH630 | Program End | SH630 05296 | 01/01/17 | | 05296 |
| 01/01/17 05:09:53 PM | 500 | SH630 | Overtravel: + | SH630 00003 | 01/01/17 | | 00003 |
| 01/01/17 05:06:51 PM | EX2028 | SH630 | Simple Block Switch ON | SH630 00003 | 01/01/17 | | 00003 |
| 01/01/17 03:29:07 PM | 500 | SH630 | Overtravel: + | SH630 05296 | 01/01/17 | | 05296 |
| 01/01/16 01:48:48 AM | 501 | SH630 | Overtravel: - | SH630 05289 | 01/01/16 | | 05289 |
| 01/01/15 09:42:00 AM | EX2028 | SH630 | Simple Block Switch ON | SH630 00542 | 01/01/15 | | 00542 |
| 01/01/15 09:28:54 AM | EX0818 | SH630 | P.P. panel mode is | SH630 00542 | 01/01/15 | | 00542 |
| 01/01/15 09:27:23 AM | EX1823 | SH630 | Conveyor fork is at 0 | SH630 00542 | 01/01/15 | | 00542 |
| 01/01/15 09:26:26 AM | EX1823 | SH630 | Conveyor fork is at 0 | SH630 00542 | 01/01/15 | | 00542 |
| 01/01/15 07:04:07 AM | 3008 | SH630 | INDEX COM NOT IN GO | SH630 00999 | 01/01/14 | | 00999 |
| 01/01/13 11:52:59 AM | 501 | SH630 | Overtravel: - | SH630 05135 | 01/01/13 | | 05135 |
| 01/01/13 11:49:18 AM | 501 | SH630 | Overtravel: - | SH630 05135 | 01/01/13 | | 05135 |
| 01/01/13 10:58:30 AM | EX0730 | SH630 | Pallet is clamped | SH630 00001 | 01/01/13 | | 00001 |

Display Conditions
Machine Name: SH630
Part No.
Order No.
Production Group
Step No.

● Alarm dates  01/01/12 ~ 01/01/18
○ No dates specified

[Display]

OPERATION MANAGEMENT SYSTEM

TECHNICAL FIELD

The present invention relates to operation administration systems furnished with one or more operational data storage/transmission devices connected to numerical controllers for machine tools each being equipped with a numerical controller, a terminal device provided where users use the machine tools, and an administration device provided for manufacturers who manufacture the machine tools, with the administration device, the operational data storage/transmission devices, and the terminal device being provided to enable connection to one another via the Internet.

BACKGROUND ART

Administration of the operation of NC machine tools is conventionally performed by machine-tool using users individually each using an operational administration system set up on the user's end. Such operational administration systems are set up by interconnecting the numerical controllers for a plurality of NC machine tools with an administration device via a LAN, the Internet or other telecommunication lines, wherein the administration device gathers and stores data pertaining to the operational status of each NC machine tool, and thus the operational status of each NC machine tool is centrally administrated based on the operational status data gathered and stored.

However, in order to carry out the operational administration with precision, vast amounts of data must be gathered accurately and quickly, and the gathered data must be reliably stored over the long term. Accordingly, this requires a high-performance administration device equipped with high-speed processors, high-capacity storage devices, and outage-free power supplies to handle power-outage occurrences.

In addition, in cases in which an administration device and numerical controllers are interconnected via the Internet, or in cases in which appropriate terminal devices and an administration device can be interconnected via the Internet so that operational status data can be obtained even outside of the plant where the operational administration system is set up, security devices for handling unauthorized access and computer viruses are required.

For this reason, it can be expensive for a user to set up such an operational administration system, and for the user the burden of doing can be heavy.

On the other hand, if the operational status of machine tools at the users' could be comprehended on the manufacturer's end in a timely manner, then an idea of maintenance schedules for, and the duty status of, the applicable NC machine tools could be had from the comprehended operational status, making it possible to perform such maintenance services as urging the preventative replacement of parts, or readying in advance parts required for replacement, thus contributing to improved customer service for the users.

In addition, since the operational status of each machine tool is difficult to grasp readily on the basis of raw data within the gathered and stored operational-status data, an informational report in which the raw data is compiled in a given format (table, chart, etc.) is ordinarily created, making it so that the operational status of each machine tool may be understood from the created informational report; yet making it so that on the manufacturer's end such informational reports are automatically generated and distributed to the users concerned would be efficient in saving each user the trouble of preparing the informational reports.

DISCLOSURE OF INVENTION

An object of the present invention, which came about taking into consideration the circumstances discussed above, is to provide an operational administration system that can lessen the expense and burden on the user end, and also permit the manufacturer to determine the operational status of machine tools on the user side in an accurate and timely manner, as well as allow users to easily obtain an informational report that summarizes the operational status.

In order to achieve the object described above, the present invention has to do with an operational administration system furnished with one or more operational data storage/transmission devices connected to each of numerical controllers for one or more machine tools furnished with the numerical controllers, a terminal device provided where users use the machine tools, and an administration device provided where a manufacturer manufactures the machine tools, said administration device, said operational data storage/transmission devices, and said terminal device being provided to enable connection to one another via the Internet; wherein:

said operational data storage/transmission devices comprise operational data storage means for storing data pertaining to operational status of the machine tools, and data gathering/transmission means for gathering from the numerical controllers data pertaining to the operational status of the machine tools, storing the data in said operational data storage means, and for checking whether a preset transmission condition is met, and only in instances in which the transmission condition is met, sending to said administration device in an e-mail data format the machine-tool operational status data stored in said operational data storage means; and said administration device comprises a database for storing machine-tool operational status data received from the operational data storage/transmission devices, data receiving/updating means for receiving machine-tool operational status data sent from said operational data storage/transmission devices, and respectively updating, with the operational status data received, the database-stored operational status data on each machine tool, ID data storage means for storing user ID information preestablished for each of the users in order to identify the users, correlatively with machine tool data for identifying the machine tools used by the users, and data transmission means, being a processor for transmitting to the terminal device operational status data stored in said database, for receiving user ID information entered through said terminal device, and for searching said ID data storage means based on the received user-ID information, checking whether the received user-ID information is stored in said ID data storage means, and only in instances in which the received user-ID information is stored, sending, in response to requests from said terminal device, to the requesting terminal device the operational status data for the machine tools identified by the machine tool data stored in said ID data storage means correlatively with the received user-ID information.

By means of this invention, first the data gathering/transmission means of each of the operational data storage/ transmission devices gathers, from the numerical controller of each machine tool, data (operational status data) pertaining to its operational status and then these data are stored in the operational data storage means.

Note that the operational status may be determined from, for example, fields pertaining to cumulative time such as the cumulative power-on time, cumulative operating time, cumulative alarm sounding time or the like, along with fields pertaining to the state of the machine tool such as "operating," "halted," "alarm sounding" or the like. In addition, the operational status data may comprise time data corresponding to the field in question or state data (e.g., 0 or 1), and the corresponding field and data are associated with each other when stored in the operational data storage means.

Moreover, checks as to whether or not predetermined transmission conditions are met are performed continuously, and only in the case that these transmission conditions are met will the operational status data for each machine tool stored in the operational data storage means be sent to the administration device in the data format of e-mail.

The operational status data thus sent is received by the data receiving/updating means, which updates the operational status data for each machine tool stored in the database using the operational status data thus received.

In this manner, the operational status data for the machine tools used by each user are sent from each operational data storage/transmission device to the administration device provided on the side of the manufacturer and stored therein. Thereby, the manufacturer is able to determine the operational status of each of the machine tools of each of the users based on the operational status data for each machine tool stored in the database.

On the other hand, the operational status data for each machine tool that is sent to the administration device and stored may be obtained by the user of each machine tool in the following manner. That is to say, the user first uses the terminal device to access the administration device and enters user ID information from this terminal device, and then this is received by the data transmission means, which searches for the ID data storage means based on the user ID information thus received, and performs a check to determine whether or not the user ID information thus entered is stored in the ID data storage means.

Then, only if this user ID information is present will the machine tool being used by that user be identified from the machine tool data that is stored such that it is associated with this user ID information, and so the operational status data stored in the database for the identified machine tool will be sent to a terminal device in response to a request from that terminal device.

Moreover, the operational status data received by the terminal device may be displayed on a screen of a CRT or other display device installed in that terminal device, or may be output from a printer or other printing device similarly attached to the terminal device as a peripheral. In this manner, each user can get operational status data for their machine tools from the administration device and determine their operational status, and thus perform operational administration for the various machine tools based on the operational status thus determined.

Note that user ID information that is set in advance for each individual user and that identifies that user is stored in advance in the ID data storage means, in a manner such that it is associated with machine tool data that identifies the machine tools used by that user. Examples of this user ID information may include a user ID and password or the like.

Thus, with the operational administration system according to the present invention, the user can access the administration device from their terminal device as necessary to obtain operational status data from this administration device, or namely the centralized administration of the operational status of each machine tool is possible through operational status data obtained from the administration device, so it is not necessary for each user to have their own proprietary administration device, and thus the user's burden of the cost required to construct an operational administration system can be greatly reduced in comparison to the past, and also the labor and costs required for its administration can be reduced.

In addition, the user is able to access the administration device easily via the Internet from anywhere and obtain operational status data from the administration device. In addition, operational status data can be obtained from the administration device to determine even the operational status of machine tools installed in factories in remote areas including overseas, so supervision can be performed easily by the headquarters or other administrating departments.

On the other hand, the manufacturer can determine the operational status of each of the machine tools of each user in an accurate and timely manner based on the operational status data stored in the administration device, so the manufacturer is able to use the operational status thus determined to establish maintenance schedules for the machine tools and determine the situation of the loads thereon, so the manufacturer is able to provide such maintenance services as suggesting the preventative replacement of parts, or getting the parts required for replacement ready in advance, and thus improve customer service with respect to the users.

In addition, the configuration is such that when a user obtains operational status data from the administration device, the user ID information is checked and the operational status of only those machine tools corresponding to the ID information can be obtained, so it is possible to prevent the operational status of the machine tools from being leaked to third parties other than the user.

In addition, the system has flexibility in that the operational status data gathered and stored by the operational data storage/transmission device can be sent from the operational data storage/transmission device to the administration device by merely specifying the destination address to which it is to be sent, regardless of where the sending operational data storage/transmission device and the destination administration device are installed, and moreover data with no time gaps can be sent to the administration device side.

The data gathering/transmission means and data receiving/updating means may have the following configuration instead of the configuration described above. That is to say, the data gathering/transmission means may be configured so as to: gather from the numerical controllers data pertaining to the operational status of the machine tools, store the data in said operational data storage means, and to check whether a preset transmission condition is met, and only in instances in which the transmission condition is met, based on the machine-tool operational status data stored in the operational data storage means, generate transmission data of a structure in which data element identifiers defining items involving the operational status of the machine tools are correlated with the operational status data corresponding to the items, and send to said administration device the generated transmission data; and the data receiving/updating means may be configured so as to: receive the transmission data sent from said operational data storage/transmission devices, and to analyze the data element identifiers in the received transmission data, recognize the items involving the machine-tool operational statuses defined by the data element identifiers, and respectively update, with the operational status data received, the operational status data, being database-stored data on each machine tool, corresponding to the recognized items.

Thus, in the same manner as above, first the data gathering/transmission means gathers, from the numerical controller of each machine tool, data pertaining to its operational status and then these data are stored in the operational data storage means.

Moreover, checks as to whether or not predetermined transmission conditions are met are performed continuously, and only in the case that these transmission conditions are met will the operational status data for each machine tool stored in the operational data storage means be sent to the administration device.

Namely, first the operational status data for each machine tool is organized into transmission data of a structure wherein data element identifiers that define fields pertaining to the operational status of each of the machine tools are associated with the operational status data corresponding to that field. A data element ID refers to a so-called tag and the fields pertaining to the operational status are defined by these tags. Thus, the operational status data may be organized into transmission data of a structure such that the data is written between pairs of tags, and thus the fields pertaining to the operational status are associated with the operational status data. The transmission data thus generated is then sent to the administration device.

The transmission data thus sent is received by the data receiving/updating means, which analyzes those data element identifiers, recognizes the fields pertaining to the operational status of each of the machine tools that are defined by these data element identifiers, and uses the received operational status data to update operational status data corresponding to the respective fields that are recognized as data for various machine tools that is present in the database.

In this manner, the transmission data sent from the operational data storage/transmission device has a structure such that the fields pertaining to the operational status of each machine tool are mutually associated with the operational status data, so the operational status data corresponding to the operational status fields can be readily discerned, and thus the data updating described above can be performed accurately. In addition, the fields for which data is to be stored can be easily added and changed.

In addition, the data gathering/transmission means may also have a configuration such that it connects to the Internet and sends the operational status data only at the time of sending the operational status data stored in the operational data storage means, and after the transmission is complete, disconnects from the Internet.

If this is done, then the operational data storage/transmission device connects to the Internet only when sending operational status data, so safety with respect to unauthorized access and computer viruses can be greatly improved.

Note that the aforementioned transmission condition may be a condition set with respect to the amount of data stored in the operational data storage means, and in this case, the data gathering/transmission means may have a configuration wherein, the amount of data stored in the operational data storage means is used as the transmission condition, so the amount of data stored is compared against a reference amount of data, and the operational status data stored in the operational data storage means is sent to the administration device when the amount of data stored reaches the reference amount of data.

Alternately, the aforementioned transmission condition may be a condition set with respect to the time taken to gather data, and in this case, the data gathering/transmission means may have a configuration wherein, the time taken to gather data is used as the transmission condition, so the time taken to gather data is compared against a reference amount of time, and the operational status data stored in the operational data storage means is sent to the administration device when the data gathering time exceeds the reference amount of time.

In this way, the operational status data stored in the operational data storage means can be sent to the administration device at appropriate times, so it is possible to prevent data that should be stored in the operational data storage means from being discarded due to an overflow of its capacity, and thus this operational status data can be made more accurate.

In addition, in the aforementioned operational administration system, the administration device may comprise, in lieu of the ID data storage means and data transmission means, an informational-report generation/transmission means that, based on the operation situation data stored in the database, regularly or irregularly generates informational reports that summarize the operational status of the various machine tools within a predetermined time period, and sends the generated informational reports to the terminal device, and the terminal device receives the informational reports sent from the administration device and stores the received informational reports.

In this way, informational reports that summarize the operational status of the various machine tools, which may be listings that present the alarm log or operating log of the various machine tools, graphs that present the operational statuses of the various machine tools, or Pareto charts illustrating the frequency that various alarms sound are generated by the informational-report generation/transmission means and sent to the terminal device.

The informational reports thus sent are received and stored by the terminal device, and may be displayed on a CRT screen or other display device installed in that terminal device, or may be output from a printer or other printing device similarly attached to the terminal device as a peripheral.

Thereby, each user can determine the operational status of each machine tool based on the informational reports that are automatically compiled and sent by the administration device, and can administrate this information centrally, so the same meritorious effects as above can be obtained. In addition, in order to determine the operational status for each machine tool, there is no need for the users themselves to create informational reports as is conventionally required, so this is more efficient.

In addition, the informational-report generation/transmission means may also be constituted such that it sends the generated informational reports to the terminal devices as an e-mail attachment, and if this is done, informational reports compiled by the administration device can be sent from the administration device to the terminal devices by merely specifying the destination addresses to which they are to be sent, regardless of where the sending administration device and the destination terminal devices are installed.

BRIEF DESCRIPTION OF DRAWINGS

In addition, FIG. 4 is an explanatory diagram representing the structure of data stored in an operational data storage unit according to this embodiment;

FIG. 13 is an explanatory diagram for illustrating one example of e-mail in this embodiment.

In addition.

FIG. 15 is an explanatory diagram representing the structure of data stored in an ID data storage unit involving this embodiment; and FIGS. 16 through 19 are explanatory diagrams illustrating single examples of Web pages generated by the registering/browsing processor involving this embodiment.

In addition.

BEST MODE FOR CARRYING OUT THE INVENTION

Here follows a description of preferred embodiments of the present invention made with reference to the appended drawings.

Figure 1:
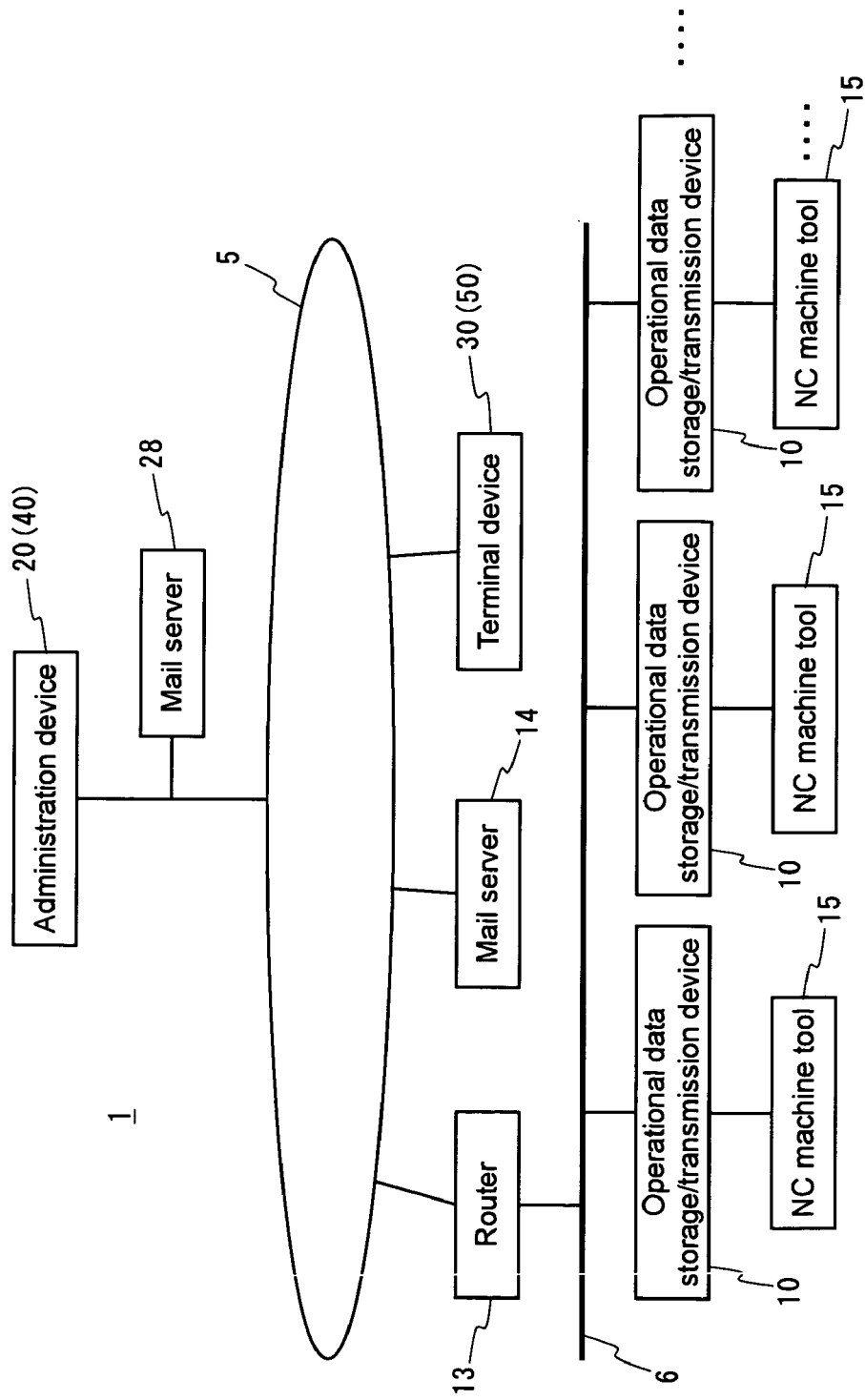
FIG. 1 is a block diagram presenting a configurational outline of an operational administration system according to a first embodiment of the present invention.

As shown in FIG. 1, an operational administration system 1 in the present embodiment comprises: a plurality of operational data storage/transmission devices 10 each connected to one of a plurality of NC machine tools 15, an administration device 20 provided on the side of the manufacturer who manufactures the NC machine tools 15 and a terminal device 30 provided on the side of a user who uses the NC machine tools 15, where the operational data storage/transmission devices 10, administration device 20 and terminal device 30 are interconnected via the Internet 5.

Note that the administration device 20 functions as a file server that receives and stores data sent from the operational data storage/transmission devices 10, and also as a WWW server and otherwise as an Internet server and as a server provided with CGI script. On the other hand, the terminal device 30 functions as a client provided with a browser. Here follows a detailed description of the various components.

A. Operational Data Storage and Transmission Device

Figure 2:
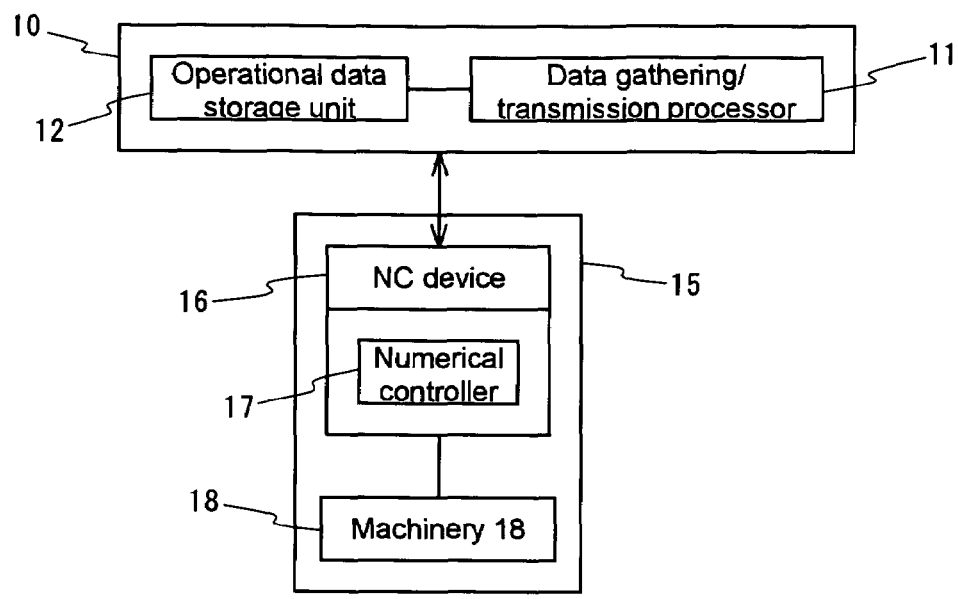
FIG. 2 is a block diagram presenting a configurational outline of an NC machine tool and an operational data storage/transmission device involving this embodiment.

As shown in FIG. 1 and FIG. 2, each operational data storage/transmission device 10 comprises a data gathering/transmission processor 11 and an operational data storage unit 12, and is connected on a one-to-one basis to an NC device 16 of the NC machine tool 15, and also is connected to the Internet 5 via a LAN 6 and router 13. Note that the NC device 16 is provided with a numerical controller 17, and the NC machine tool 15 is provided with machinery 18 that is controlled by this numerical controller 17.

The operational data storage unit 12 is a functional unit that stores data pertaining to the operational status of the NC machine tools 15 (operational status data), which is gathered by the data gathering/transmission processor 11; more specifically the unit is provided with data tables for items including, as shown in FIG. 4, "Operating State A," "Operating State B," "Operating State C," "Machining Results," and "Alarm Log," wherein the unit stores operational status data corresponding to these items.

Note that in FIG. 4, "Machine Status" is expressed by one of three statuses: "running," which is a state in which the machinery 18 is being driven; "halted," which is a state in which the machinery 18 is not being driven; and "alarm sounding," being a warning state. The "cumulative operating time" is the cumulative amount of time during which the "running" state continues.

The data gathering/transmission processor 11 is a processor that gathers operational status data for the NC machine tools 15 from the numerical controller 17 of the NC device 16, stores it in the operational data storage unit 12, and, based on the operational status data stored in the operational data storage unit 12, generates transmission data of a structure wherein data element identifiers (tags) that define fields pertaining to the operational status are associated with the operational status data corresponding to that field, and sends the transmission data thus generated to the administration device 20. Specifically, the processor is constituted so as to execute the processing illustrated in FIGS. 5 through 11.

Here follows a description of the processing performed by this data gathering/transmission processor 11 based on FIGS. 5–11 in sequence.

Figure 5:
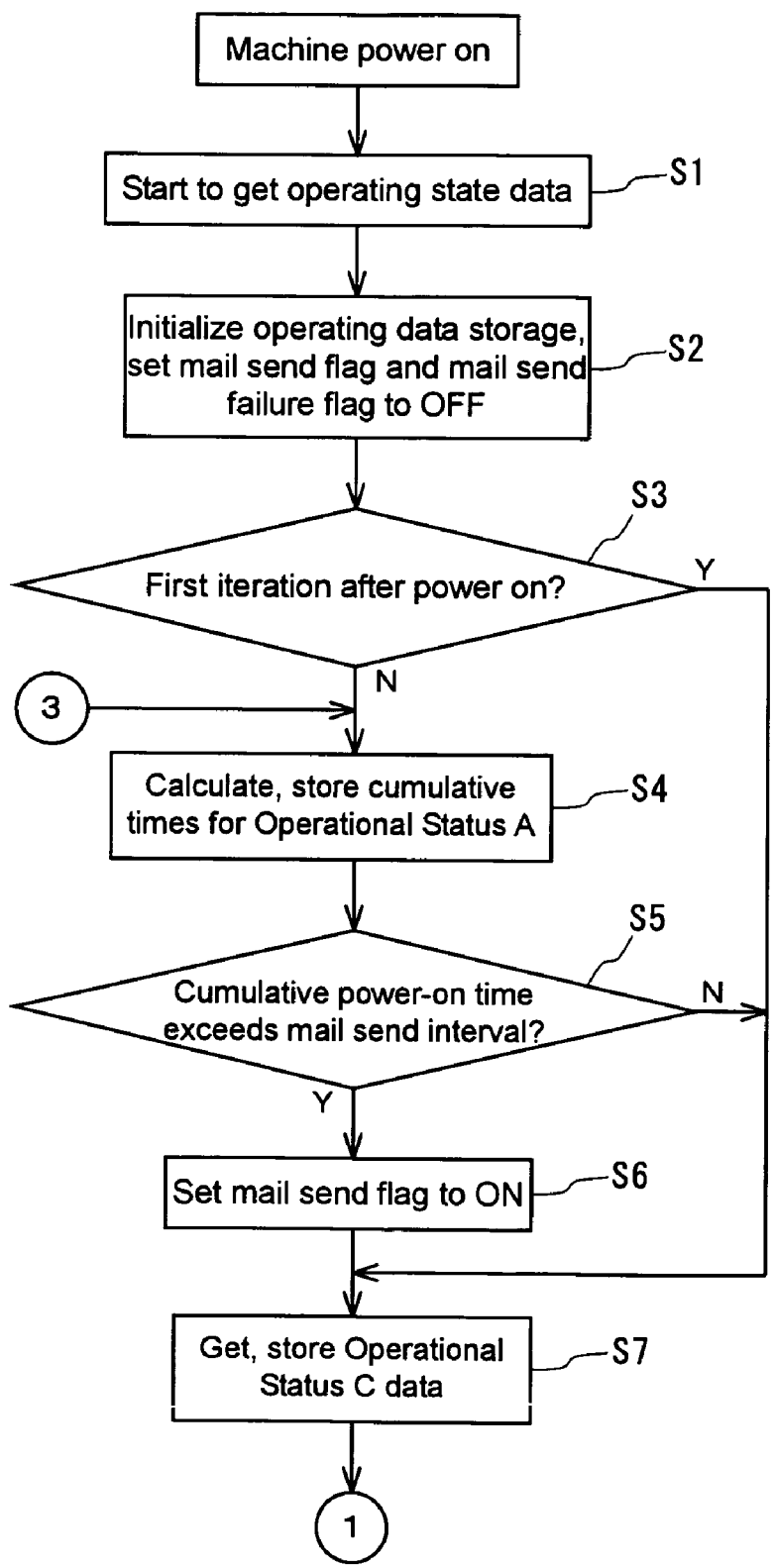
FIGS. 5 through 11 are flowcharts illustrating processing procedures in a data editing/transmission processor of this embodiment.

As shown in FIG. 5, after the main power supply for the NC machine tools 15 is turned ON, the data gathering/transmission processor 11 starts the process of acquiring operational status data pertaining to that NC machine tool 15 (Step S1), and first initializes the operational data storage unit 12 and also turns OFF an e-mail send flag and mail send failure flag (Step S2).

Next, after checking if it is the first time to get data after power-on (Step S3), control advances to Step S7 (described later) if it is the first time to get data, but if it is the second or subsequent time to get data, the process of calculating the cumulative times in Operating State A shown in FIG. 4 and storing them in the operational data storage unit 12 is performed (Step S4).

Figure 8:
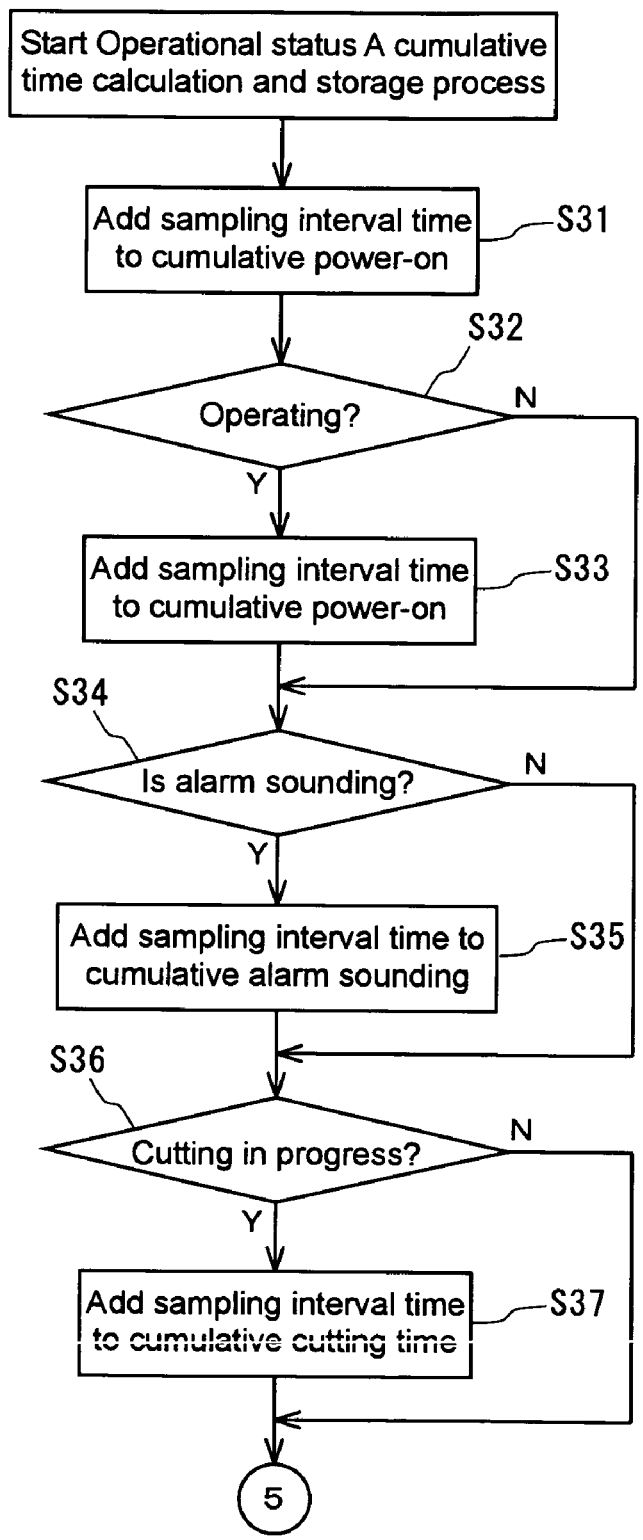
Figure 9:
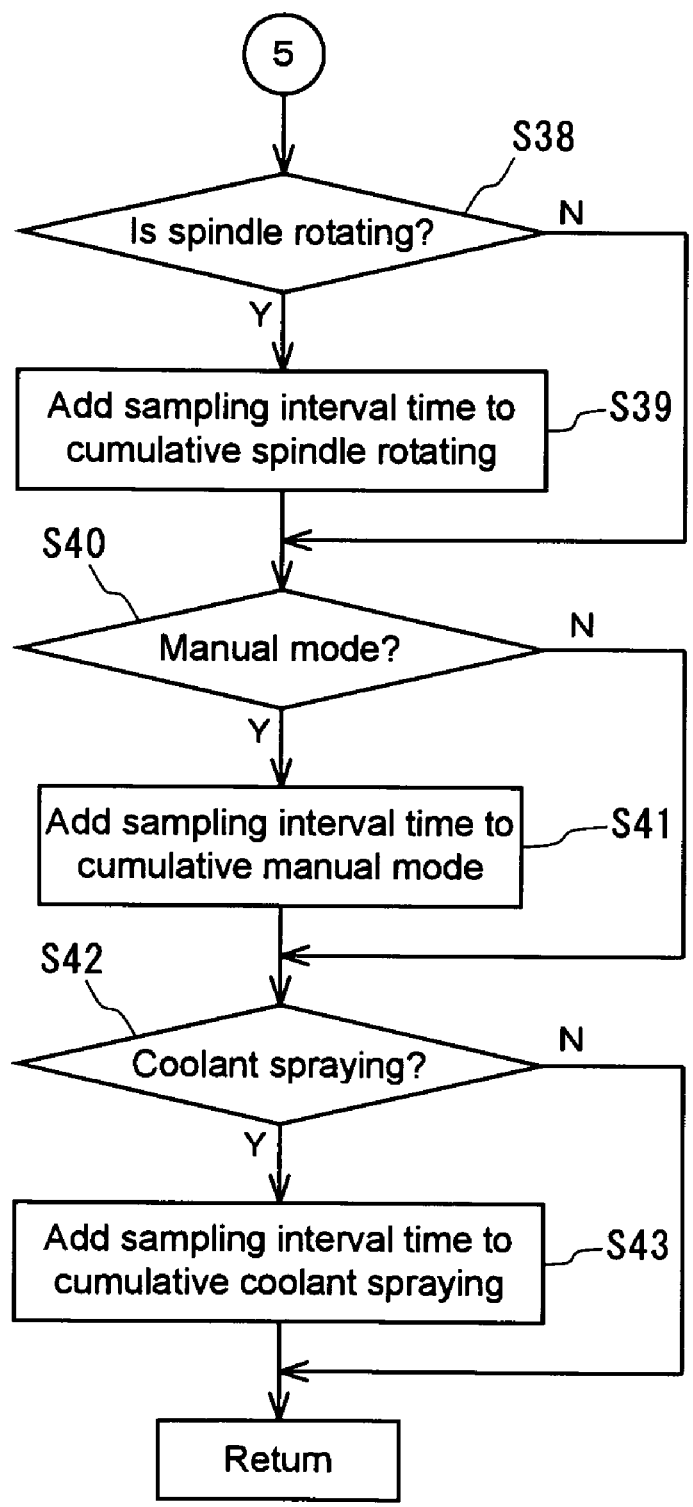

As shown in FIG. 8 and FIG. 9, the process of calculating and storing the cumulative times in Operating State A is performed (Step S31) by taking the cumulative power-on time stored in the operational data storage unit 12 and adding the sampling interval time (time found by subtracting the time when the previous sampling was performed from the time when the current sampling was performed), then checking the NC machine tool 15 for various status conditions, and if one of these status conditions applies, performing the process of adding the sampling interval time to the cumulative times stored in the operational data storage unit 12.

Specifically, a check as to whether or not the NC machine tool 15 is operating is performed (Step S32), and if operating, the sampling interval time is added to the cumulative operating time (Step S33), and then a check as to whether or not an alarm is sounding is performed (Step S34), and if an alarm is sounding, the sampling interval time is added to the cumulative alarm sounding time (Step S35), and next a check as to whether or not the NC machine tool 15 is cutting is performed (Step S36), and if it is cutting, the sampling interval time is added to the cumulative cutting time (Step S37).

In addition, a check as to whether or not the spindle of the NC machine tool 15 is rotating is performed (Step S38), and if rotating, the sampling interval time is added to the cumulative spindle rotating time (Step S39), and then a check as to whether or not the NC machine tool 15 is in manual mode is performed (Step S40), and if in manual mode, the sampling interval time is added to the cumulative manual mode time (Step S41), and next a check as to whether or not the NC machine tool 15 is spraying coolant is performed (Step S42), and if it is spraying coolant, the sampling interval time is added to the cumulative coolant spraying time (Step S43).

Then, once the process of calculating and storing the cumulative times is complete, control returns to the main process shown in FIG. 5 and advances to Step S5.

In Step S5, a determination is made as to whether or not the cumulative power-on time stored in the operational data storage unit 12 has exceeded a preset e-mail send interval. This e-mail send interval is the interval between the time when the previous e-mail was sent and the time when the next e-mail is to be sent and can be set as suitable in advance. If this e-mail send interval has been exceeded, the e-mail send flag is set to ON (Step S6), but if the e-mail send interval has not been exceeded, control advances to Step S7.

In this case, the determination of whether or not to send e-mail is made based on the e-mail send interval instead of the amount of data (to be described later), and this is done when the amount of data acquired at one time is small. In this case, due to the content of machining, it would take a long time for the amount of data stored in the operational data storage unit 12 to reach the amount set as the transmission criterion, so the updating of data on the administration device 20 side would not be performed for a long time.

Next, in Step S7, the process of acquiring data pertaining to Operating State C shown in FIG. 4 from the numerical controller 17 and storing it in the operational data storage unit 12 is performed. As described above, Operating State C is represented by the three status conditions "running," "halted," and "alarm sounding," and in the event that there is a change from the previous machine status, that machine status, the date and time when that machine status started (date and time of the start of that status)—that is, the date and time when the data was acquired—and its program number (O number) are associated with each other and stored in the operational data storage unit 12. Note that this storage process is not performed if there is no change in the machine status. In addition, the date and time of the start of that status is also the date and time of the end of the previous machine status.

Next, a check is made as to whether or not the data pertaining to Operating State C that is stored in the operational data storage unit 12 in this manner has reached 60 sets (Step S8), and if 60 sets have been reached, the e-mail send flag is set to ON (Step S9), but if 60 sets have not been reached, control advances to Step S10. Step S8 is the process of determining whether or not to send e-mail, so when there are more than 60 sets of data, this exceeds the memory capacity set in the operational data storage unit 12 for Operating State C, so this 60 sets is used as the criterion for determining whether or not to perform the e-mail transmission.

Figure 10:
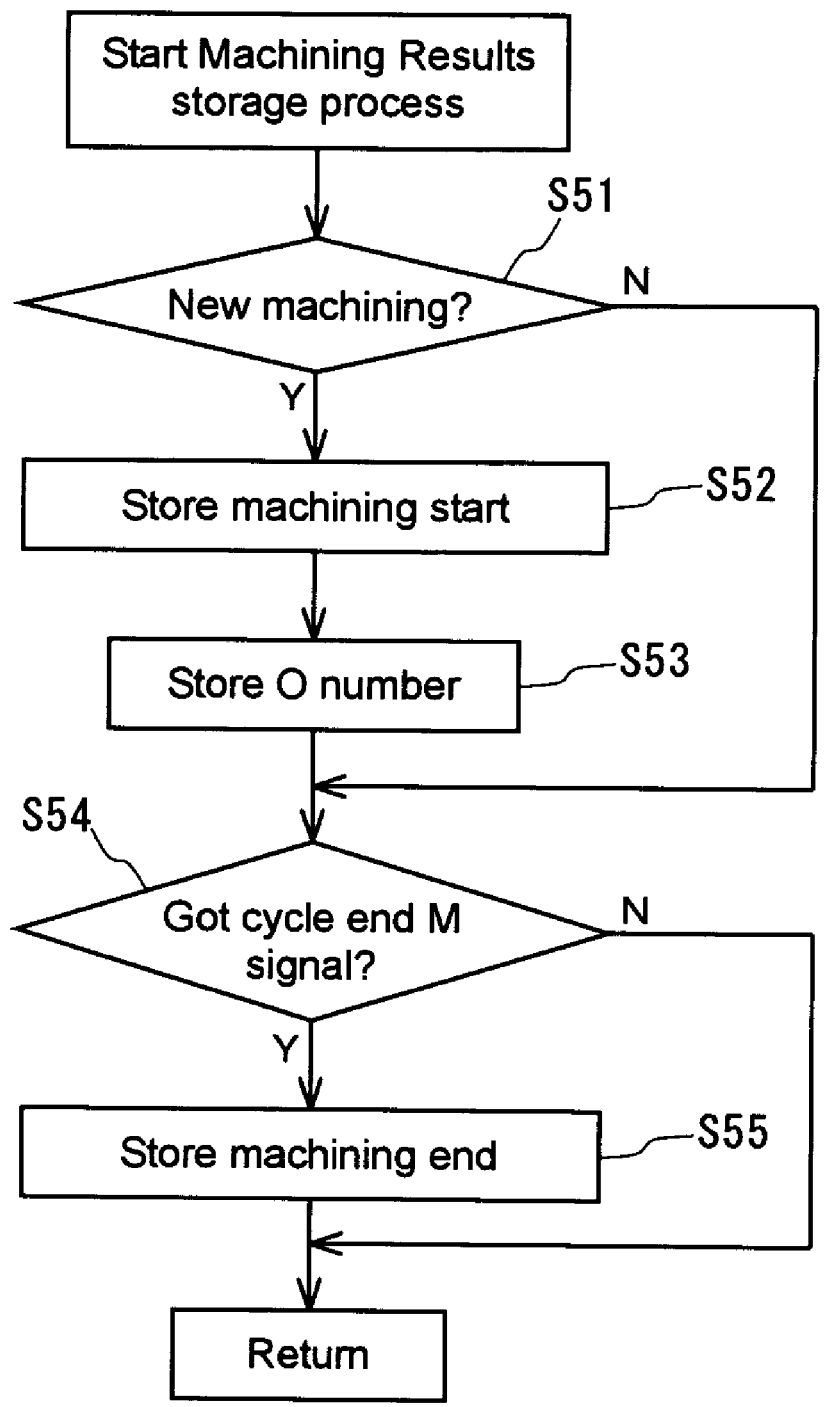

In Step S10, the process of acquiring and storing the Machining Results data illustrated in FIG. 10 is performed. That is to say, first a check is made as to whether or not the NC machine tool 15 has started a new machining operation (Step S51), and if it is not a new machining operation, control advances to Step S54, but if it is not a new machining operation, the current date and time are stored in the operational data storage unit 12 as the date and time of the start of machining (Step S52) and also the O number which is the number of the NC machining program currently being executed is stored in the operational data storage unit 12 (Step S53). Note that the O number and the date and time of the start of machining are stored in the operational data storage unit 12 such that they are associated with each other.

When the processing of Step S53 ends, control next advances to Step S54, where a check is made as to whether or not the M signal that defines the end of machining (cycle end) has changed from OFF to ON. If it is confirmed to have changed to ON, then the current date and time is stored in the operational data storage unit 12 as the date and time of the end of machining (Step S55).

Figure 6:
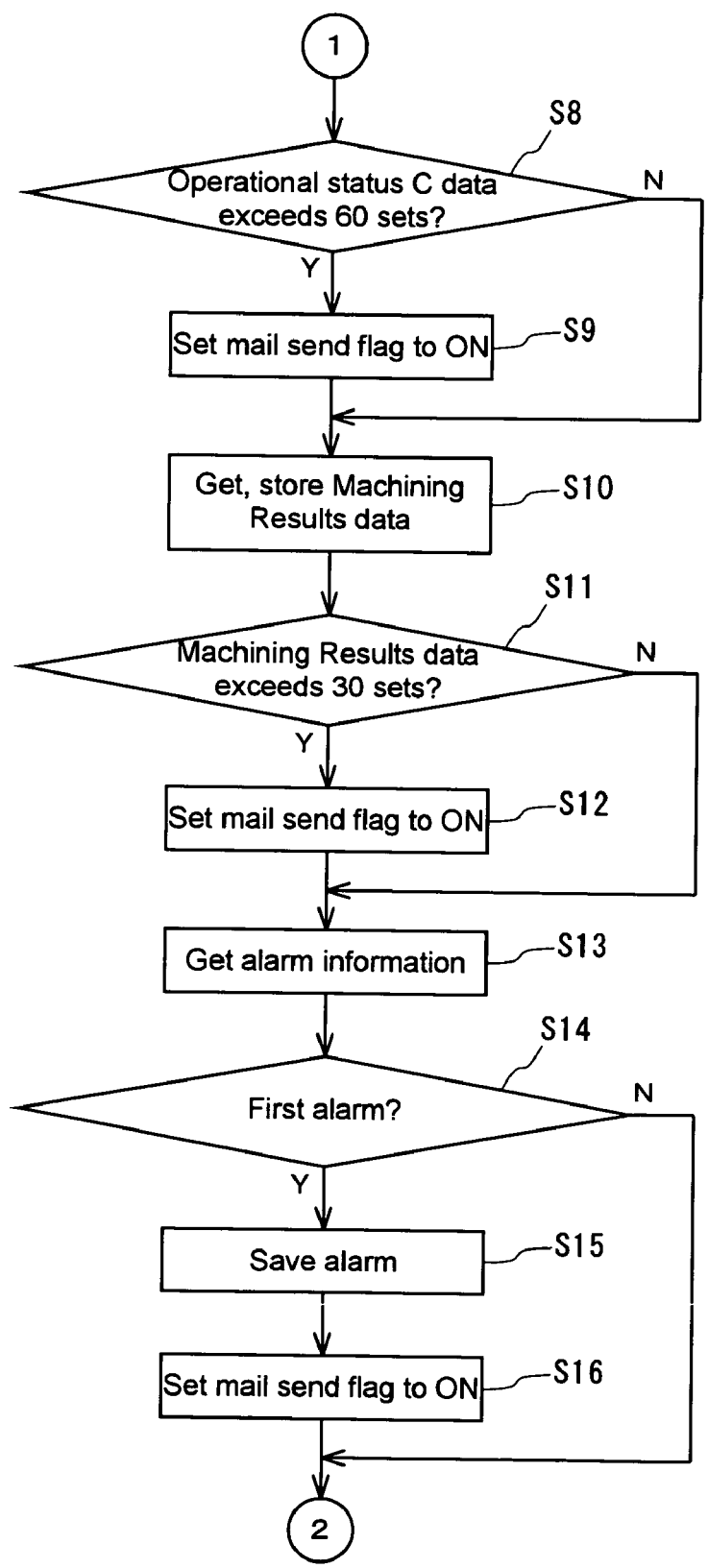
Figure 7:
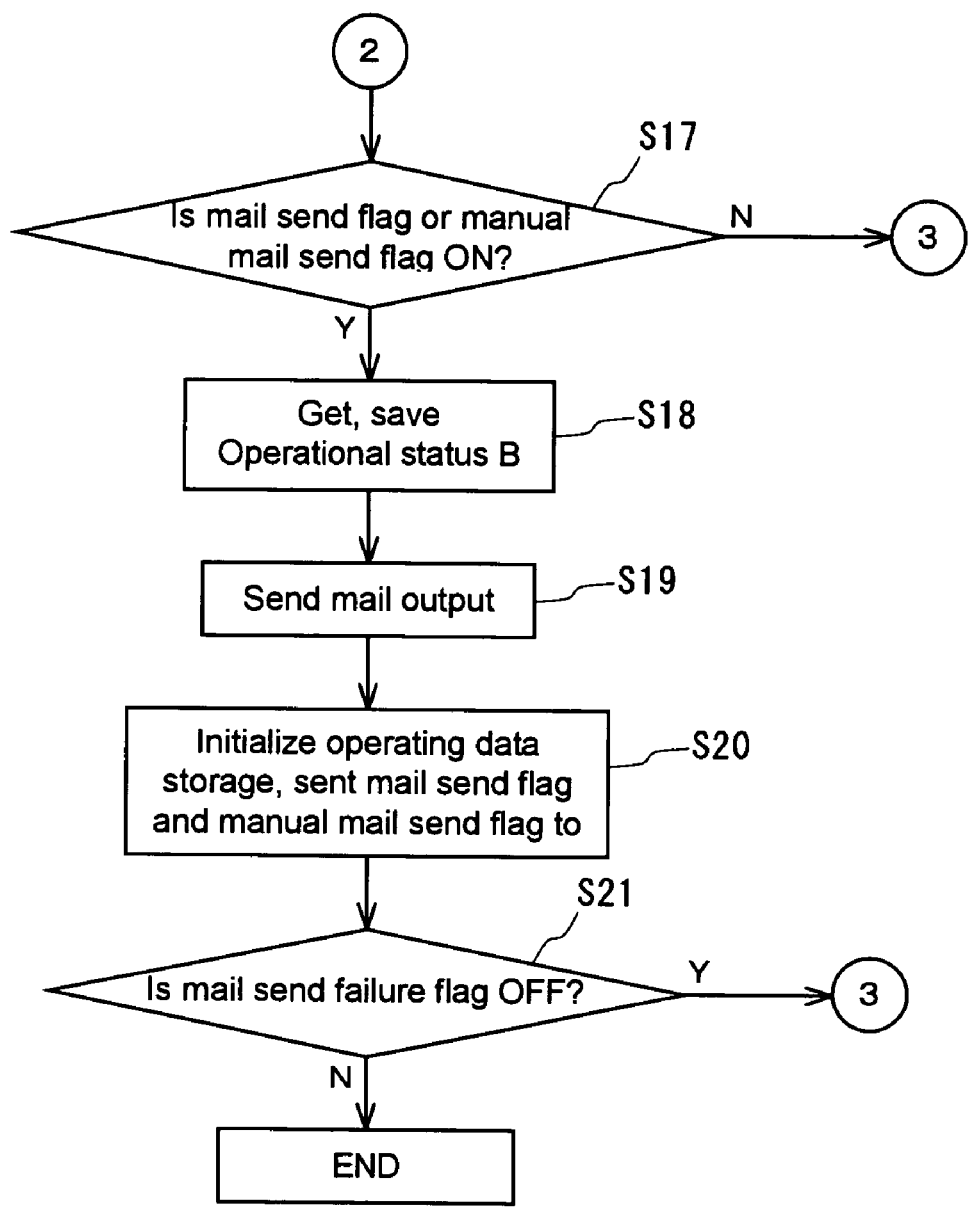

Moreover, after the processing of Step S55 ends, or if the M signal is determined not to have changed from OFF to ON in Step S54, then this process ends and control returns to the main process shown in FIG. 6 and advances to Step S11.

In Step S11, a check is made as to whether or not the Machining Results data that is stored in the operational data storage unit 12 in this manner has reached 30 sets, and if 30 sets has been reached, the e-mail send flag is set to ON (Step S12), but if 30 sets has not been reached, control advances to Step S13. Step S11 is the process of determining whether or not to send e-mail, so when there are more than 30 sets of data, this exceeds the memory capacity set in the operational data storage unit 12 for Machining Results, so this 30 sets is used as the criterion for determining whether or not to perform the e-mail transmission.

Next, in Step S13, alarm information is acquired from the numerical controller 17, and a check is made as to whether or not the alarm thus acquired is a new alarm (Step S14), and if it is a new alarm, the alarm information (date and time the alarm sounded (date and time when the data was acquired), alarm number, alarm message and O number when the alarm sounded) thus acquired is stored in the operational data storage unit 12 (Step S15), and then the e-mail send flag is set to ON (Step S16). Moreover, after the processing of Step S16 ends, or if the alarm is determined to be continuing in Step S14, then control advances to the next step, Step S17.

Next, in Step S17, a check is made as to whether the e-mail send flag is ON or the manual e-mail send flag is ON, and if both the e-mail send flag and the manual e-mail send flag are OFF, control advances to Step S4 and the subsequent processing is executed. On the other hand, if either the e-mail send flag or the manual e-mail send flag is ON, next the data pertaining to Operating State B (see FIG. 4) is acquired from the numerical controller 17 and stored in the operational data storage unit 12 (Step S18) and then the e-mail send process illustrated in FIG. 11 is performed (Step S19).

Note that here, the manual e-mail send flag is a flag that is set to ON when the operator presses a "Send" switch provided on the screen, which the operator can do if he wishes to send the operational status data to the administration device 20. The data stored in the operational data storage unit 12 will disappear when the power of the NC machine tool 15 is turned off, so that by pressing the "Send" switch before turning off the power to the NC machine tool 15, it is possible to send the data accumulated since the previous send. This permits even more accurate operational status administration to be performed.

Figures 11, 12:
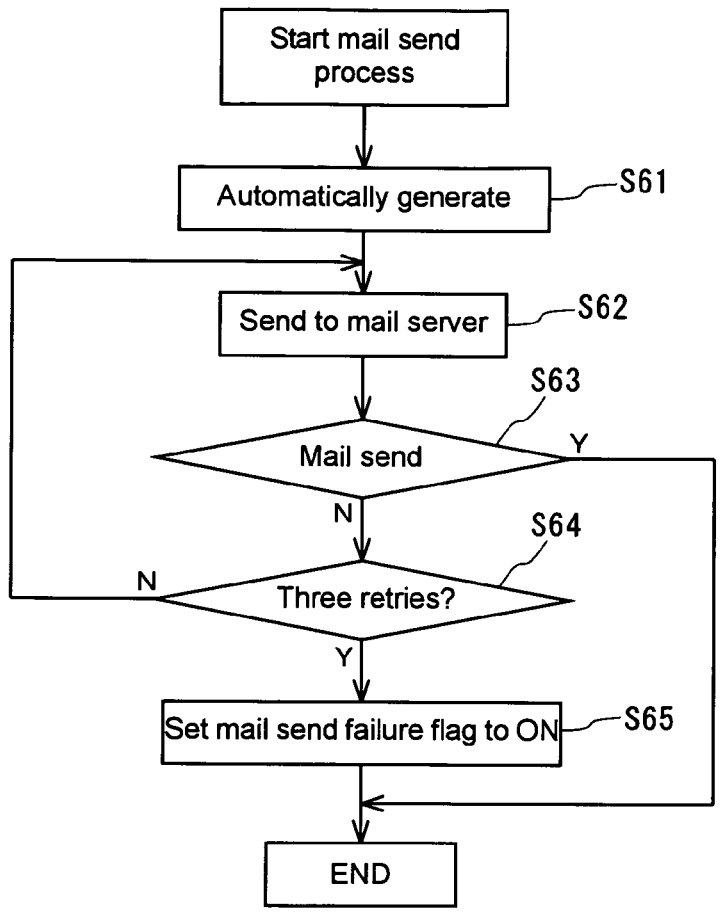
FIG. 12 is an explanatory diagram for explaining the automatic generation of e-mail in this embodiment.

The e-mail send process is executed in parallel with the processing in Step S20 and thereafter, and as shown in FIG. 11, first in Step S61, the process of automatically generating, based on the data stored in the operational data storage unit 12, transmission data containing operational status data in e-mail data format as shown in FIG. 13 is performed.

This e-mail comprises a header portion made up of the e-mail addresses of the recipient and the sender and the like, and an e-mail body portion, where the body of the e-mail comprises tags (data element identifiers) that define fields pertaining to the operational status (see FIG. 12), along with operational status data corresponding to these fields, in a format wherein the operational status data is written between pairs of corresponding tags.

To describe an example based on FIG. 13, the tag <M_MCNDTL> means that data pertaining to Operating States A and B follows the tag. Thus, the subsequent alphabetic data is the values of the following variables in order: cumulative power-on time, cumulative operating time, cumulative alarm sounding time, cumulative cutting time, cumulative spindle rotating time, cumulative manual mode time, cumulative coolant spraying time, machine status, O number for the machining in progress, sequence number, operating mode, signal block flag, optional stop flag, block delete flag, dry run flag, coolant ON flag, and rapid feed override. The closing tag </M_MCNDTL> means that data pertaining to Operating State A and B precedes the tag.

Note that the tag definitions illustrated in FIG. 12 are merely examples; these examples in no way limit any further or more detailed definitions.

Once an e-mail message is generated automatically in this manner, a connection to the Internet 5 is established and the process of sending the e-mail message thus generated to the specified mail server, or namely the administration device 20 (Step S62) is performed. Note that in this example, the e-mail message is sent via a router 13 to a mail server 14 and then forwarded from this mail server 14 to a mail server corresponding to the specified e-mail address, mail server 28 in this example.

Next, a check as to whether or not the mail send was successful is made and if successful, the process ends (Step S63), but if the send failed, three attempts to resend are made (Step S64), and if the send was not successful on all three tries, the process ends with the mail send failure flag set to ON (Step S65). Note that at the end of the process, the Internet 5 is disconnected and then the process is ended.

On the other hand, in Step S20, the operational data storage unit 12 is initialized, the mail send flag and manual mail send flag are turned OFF and then, in the next step a check of the mail send failure flag is performed to check as to whether or not the e-mail send process was successful (Step S21), and in case of failure, some sort of trouble is determined to have occurred in communication, so a warning message to that effect is displayed and the process of acquiring operational status data itself ends. If not, control returns to Step S4 shown on FIG. 5, and the process is repeated thereafter.

B. Administration Device

Figure 3:
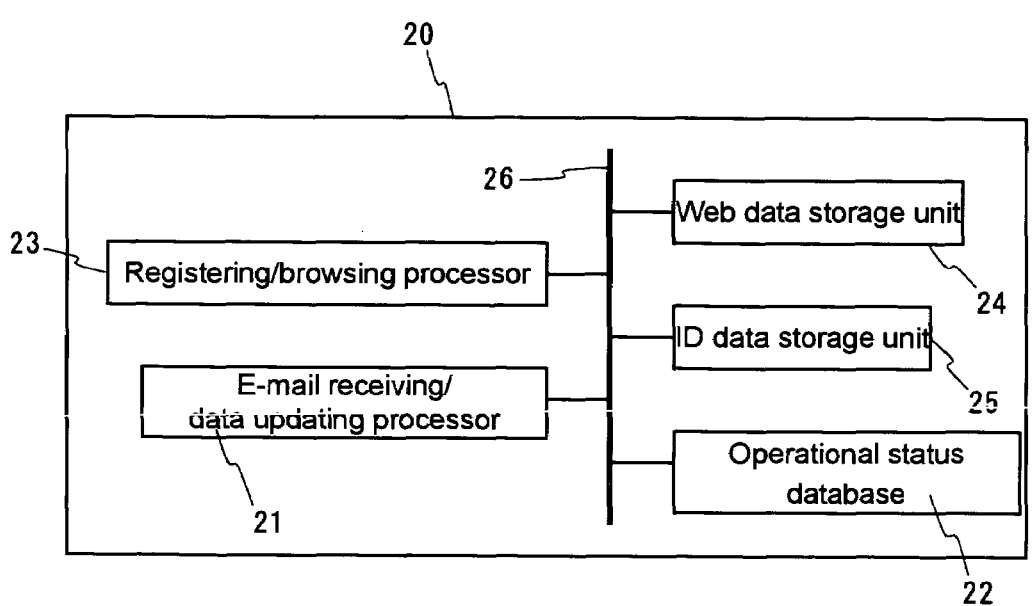
FIG. 3 is a block diagram presenting a configurational outline of an NC machine tool and an operational data storage/transmission device according to this embodiment.

As shown in FIG. 1 and FIG. 3, the administration device 20 comprises: a e-mail receiving/data updating processor 21, operational status database 22, registering/browsing processor (data transmission means) 23, Web data storage unit 24 and ID data storage unit 25 connected via a bus 26, which is appropriately connected to the Internet 5 via a LAN or the like.

The operational status database 22 is a functional unit that stores operational status data sent from the operational data storage/transmission devices 10, and is provided with data tables named "Operating State A," "Operating State B," "Operating State C," "Machining Results," "Alarm Log" and such as shown in FIG. 4 for each of the NC machine tools 15, and thus stores operational status data corresponding to the various fields thereof. In addition, the operational status database 22 stores the data tables in a manner that they are associated in advance with the e-mail address of the sender of the operational status data (namely, the user).

Figure 14:
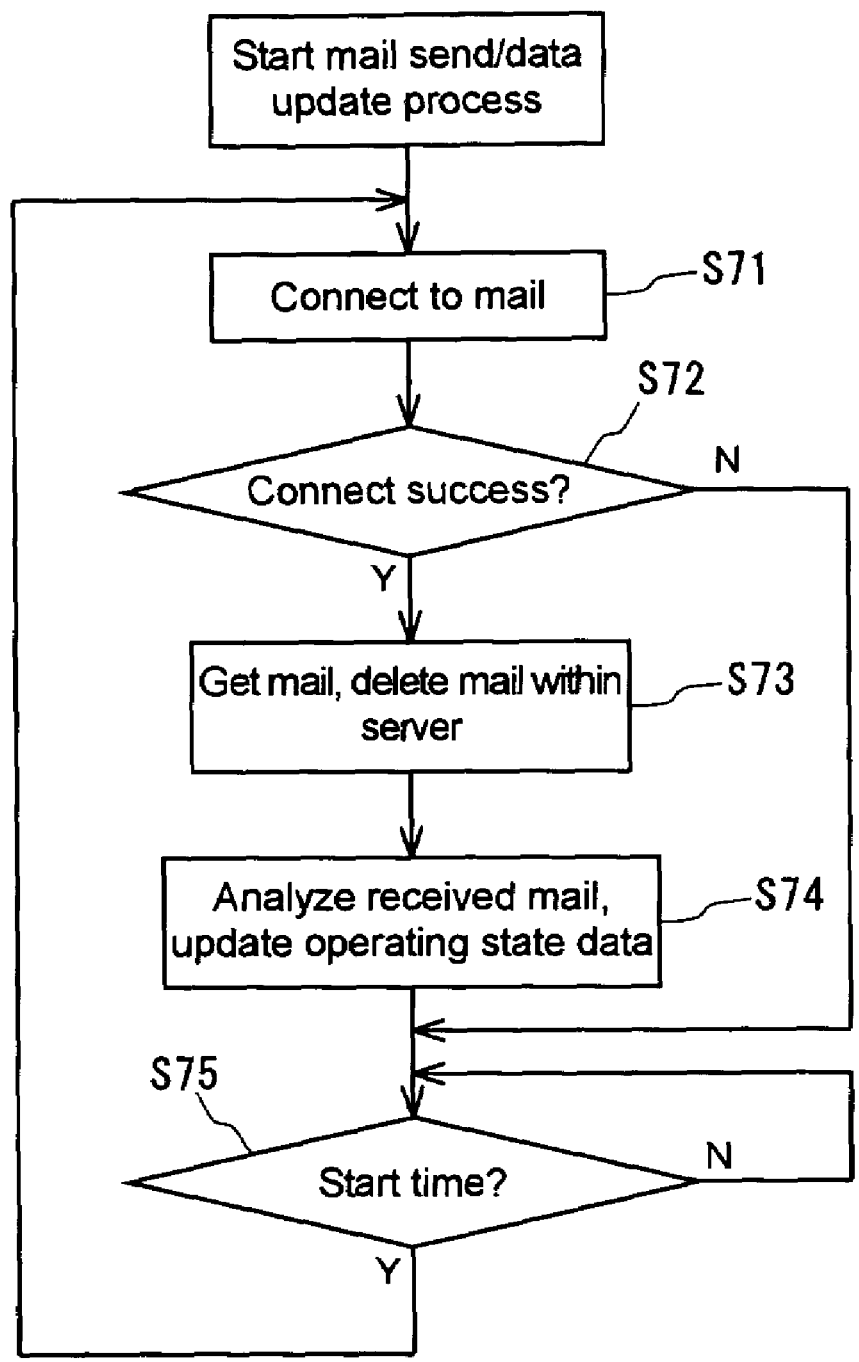
FIG. 14 is a flowchart illustrating a processing procedure in an e-mail-receiving/data-updating processor in this embodiment.

The e-mail receiving/data updating processor 21 sequentially executes the process illustrated in FIG. 14 to receive e-mail sent from the operational data storage/transmission devices 10 to mail server 28, analyze the e-mail thus received and update the operational status data for that NC machine tool 15 in the data table corresponding to the e-mail address of the sender.

Specifically, as shown in FIG. 14, it connects to the mail server 28 (Step S71), and if the connection is successful, gets the mail from this mail server 28 and performs the process of deleting mail within the mail server 28 (Step S73), and then analyzes the mail thus received and uses the operational status data contained in this e-mail to update the operational status data for that NC machine tool 15 (Step S74).

As described above, the body of the e-mail comprises tags that define the fields pertaining to the operational status along with operational status data corresponding to that field, in a format wherein the operational status data is written between pairs of corresponding tags. Accordingly, it is possible to identify the fields pertaining to the operational status and the operational status data corresponding thereto by recognizing the tags. The e-mail receiving/data updating processor 21 analyzes these tags and recognizes the corresponding machine number, namely the NC machine tool 15, operational status fields and operational status data and the like, and then updates the operational status data for that NC machine tool 15 stored in the operational status database 22 by arithmetic addition, appending, overwriting or other processes.

Then, once the process of updating data is performed as above, the procedure waits until a preset predetermined amount of time has elapsed (Step S75), and then returns to Step S71 and repeats the process. Note that in Step S72, even in the event that the connection to the mail server 28 fails, the procedure similarly waits until the predetermined amount of time has elapsed in Step S75 and then repeats the process starting from Step S71.

The Web data storage unit 24 is a functional unit that stores in advance various data for sending various types of information via the Internet 5 (in other words, data for creating Web pages).

An ID data storage unit 25 is a functional unit set up in advance for each user who stores user ID information for identifying that user, along with machine tool data identifying the NC machine tools 15 being used by that user, associated with the e-mail address of that user in the form of a data table such as that shown in FIG. 15. Note that as shown in FIG. 15, a user ID and password are used as the user ID information in this example.

The registering/browsing processor 23 performs the so-called registration process of associating the ID information and e-mail address and the like, entered from the corresponding terminal device 30, of users who connect to the terminal device 30 via the Internet 5 to the machine tool data, and storing the data in the ID data storage unit 25, along with the process of creating Web pages containing requested information pertaining to the operational status of the NC machine tools 15 in correspondence with requests from the corresponding terminal device 30, and sending the Web pages thus created to the terminal device 30, or namely the process of allowing information to be viewed from the terminal device 30.

Moreover, the viewing process is where the processes described below are performed sequentially, so that Web pages pertaining to the operational status are sent to the terminal device 30 and displayed on the monitor of the terminal device 30. That is to say, when there is an access from the terminal device 30 via the Internet 5 and a request to view the operational status is received, first, an input form for user ID information stored in the Web data storage unit 24 is sent to the terminal device 30 and displayed.

Then, when user ID information (user ID and password) is input from the terminal device 30, it is received and a search is performed within the ID data storage unit 25 based on this user ID information to check whether or not that user ID information is present (registered) in the ID data storage unit 25.

If the user ID information is present, next the NC machine tools 15 being used by the user are identified based on the machine tool data stored in the ID data storage unit 25 associated with that user ID information. In response to a request from the terminal device 30, based on the operational status data stored in the operational status database 22 for the NC machine tools 15 thus identified and the data stored in the Web data storage unit 24, a Web page containing information pertaining to the operational status of the requested NC machine tool 15 is created and the Web page is sent to that terminal device 30 and displayed.

On the other hand, if the user ID information is not present in the ID data storage unit 25, an error message to the effect that the user ID information is not registered (stored) is displayed on the terminal device 30.

Figure 16:
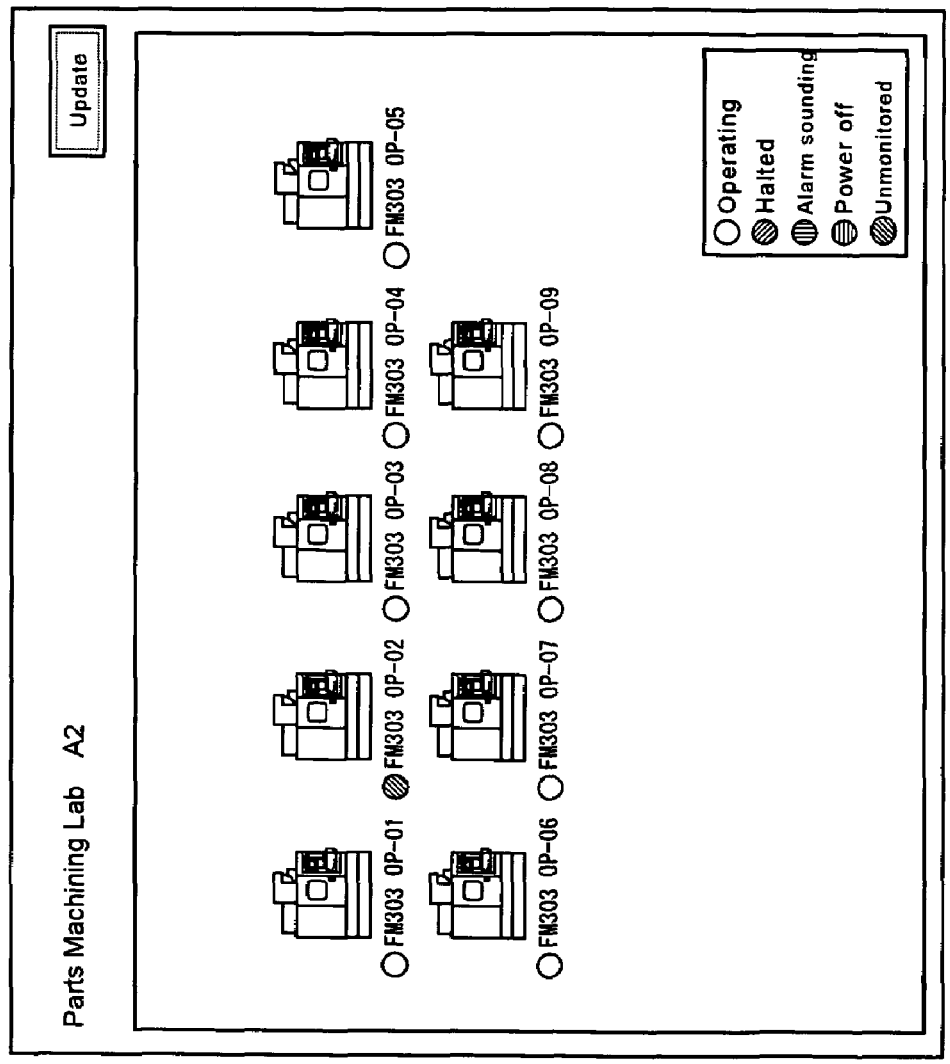

Note that specific examples of such Web pages include one that allows the state of the machines to be checked at a glance (FIG. 16), one that illustrates the operating state of various NC machine tools 15 as a graph (FIG. 17), one that presents the alarm log for the NC machine tools 15 as a list (FIG. 18), a Pareto chart of the frequency of occurrence of various alarms (FIG. 19) and other Web pages.

In addition, if the NC machine tools 15 are appropriately provided with various sensors, then data detected by these sensors pertaining to spindle vibration or temperature, for example, may also be sent to the administration device 20 and stored, so Web pages containing this data may also be displayed on the terminal device 30 in addition to the Web pages listed above.

With the operational administration system 1 according to this embodiment constituted as described above, first, at each predetermined sampling interval, the data gathering/transmission processors 11 of the operational data storage/transmission devices 10 gather operational status data for each of the corresponding NC machine tools 15 from the numerical controllers 17 of the NC devices 16 and store the operational status data thus gathered in the operational data storage unit 12.

After a predetermined amount of time has elapsed or the amount of data accumulated has reached a predetermined amount, or when manually requested, the operational status data stored in the operational data storage unit 12 is automatically organized into an e-mail message of a structure comprising tags that define fields that pertain to the operational status that are associated with operational status data corresponding to that field, and the e-mail message thus created is sent to the administration device 20 via mail servers 14 and 28.

The e-mail message thus sent is received by the administration device 20 in its mail reception and the data update processor 21 which analyzes it and recognizes the mail address of the sender along with the tagged NC machine tool 15, operational status fields, operational status data and other data, which is used to update the operational status data for the recognized NC machine tool 15 stored in the operational status database 22 by arithmetic addition, appending, overwriting or other processes.

In this manner, the operational status data for the NC machine tools 15 used by each user is sent from the operational data storage/transmission devices 10 to the administration device 20 provided on the side of the manufacturer and stored. Thereby, the manufacturer is able to determine the operational status of the NC machine tools 15 of each user based on the operational status data for each NC machine tool 15 stored in the operational status database 22.

On the other hand, when the administration device 20 is accessed from a terminal device 30 and a request to view the operational status is made, the user ID information input from the terminal device 30 is received by the registering/browsing processor 23 and first a check is made as to whether or not that user ID information is present in the ID data storage unit 25.

Next, only if the user ID information is present, the NC machine tool 15 used by that user is identified from the machine tool data that is stored associated with that user ID information, and based on the operational status data stored in the operational status database 22 for the identified NC machine tool 15 and the data stored in the Web data storage unit 24, a Web page containing information pertaining to the operational status of the requested NC machine tool 15 is generated and in accordance with a request from the terminal device 30, the Web page thus generated is sent to the terminal device 30 and displayed on its monitor.

Thereby, each user is able to view information pertaining to the operational status of their NC machine tools 15, and the information thus displayed on the monitor can be printed with a printer or other printing device attached to the terminal device 30 as a peripheral. Thus, each user can determine the operational status of the NC machine tools 15 based on this information and can perform operational administration of the NC machine tools 15 based thereupon.

Thus, with the operational administration system 1 according to this embodiment, the user can access the administration device 20 from their terminal device 30 as necessary to view information relating to the operational status of the NC machine tools 15, or namely the centralized administration of the operational status of each NC machine tool 15 is possible through information obtained from the administration device 20, so it is not necessary for each user to have their own proprietary administration device, and thus the user's burden of the cost required to construct an operational administration system can be greatly reduced in comparison to the past, and also the labor and costs required for its administration can be reduced.

In addition, the user is able to access the administration device 20 easily via the Internet 5 from anywhere and obtain operational status data from the administration device 20. In addition, operational status data can be obtained from the administration device 20 to determine even the operational status of NC machine tools 15 installed in factories in remote areas including overseas, so supervision can be performed easily by the headquarters or other administrating departments.

On the other hand, the manufacturer can determine the operational status of each of the NC machine tools 15 of each user in an accurate and timely manner based on the operational status data stored in the administration device 20, so the manufacturer is able to use the operational status thus determined to establish maintenance schedules for the NC machine tools 15 and determine the situation of the loads thereon, so the manufacturer is able to provide such maintenance services as suggesting the preventative replacement of parts, or getting the parts required for replacement ready in advance, and thus improve customer service with respect to the users.

In addition, the constitution is such that when a user obtains operational status data from the administration device 20, the user ID information is checked and the operational status of only those NC machine tools 15 corresponding to the ID information can be obtained, so it is possible to prevent the operational status of the NC machine tools 15 from being leaked to third parties other than the user.

In addition, the system has flexibility in that the operational status data gathered and stored by the operational data storage/transmission device 10 can be sent from the operational data storage/transmission device 10 to the administration device 20 by merely specifying the destination address to which it is to be sent, regardless of where the sending operational data storage/transmission device 10 and the destination administration device 20 are installed, and moreover data with no time gaps can be sent to the administration device 20 side.

In addition, the e-mail sent from the operational data storage/transmission devices 10 to the administration device 20 has a structure such that the fields pertaining to the operational status are mutually associated with the operational status data, so the operational status data corresponding to the operational status fields can be readily discerned, and thus the data updating in the e-mail receiving/data updating processor 21 described above can be performed accurately. In addition, the fields for which data is to be stored can be easily added and changed.

In addition, the operational data storage/transmission devices 10 connect to the Internet 5 only at the time of sending e-mail, so safety with respect to unauthorized access and computer viruses can be greatly improved.

In addition, the operational status data stored in the operational data storage unit 12 is automatically sent once a predetermined amount of time has elapsed or when the amount of data accumulated has exceeded a predetermined amount, so it is possible to prevent data that should be stored in the operational data storage 12 means from being discarded due to an overflow of its capacity, and thus this operational status data can be made more accurate.

The above is a description of one embodiment of the present invention, but the specific mode of implementation of the present invention is in no way limited thereto.

Figure 20:
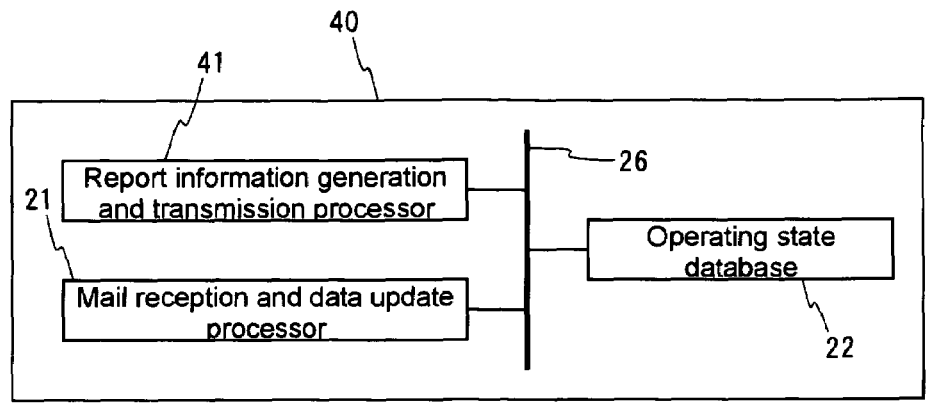
FIG. 20 is a block diagram presenting a configurational outline of an administration device involving another embodiment of the present invention.

For example, in the operational administration system 1, the administration device 20 may comprise an administration device 40 that has different functions, and similarly the terminal device 30 may comprise a terminal device 50 that has different functions, as illustrated in FIG. 1 and FIG. 20. Here follows a description of administration device 40 and terminal device 50.

The administration device 40 comprises: the e-mail receiving/data updating processor 21, the operational status database 22, and an informational-report generation/transmission processor 41 connected via the bus 26, which is appropriately connected to the Internet 5 via a LAN or the like.

Based on the operational status data for the NC machine tool 15 stored in the operational status database 22, the informational-report generation/transmission processor 41 generates informational report that summarizes the operational status of the NC machine tools 15 within a predetermined period of time, and performs the process of sending the informational report thus generated to the terminal device 50 as an e-mail attachment.

Figure 21:
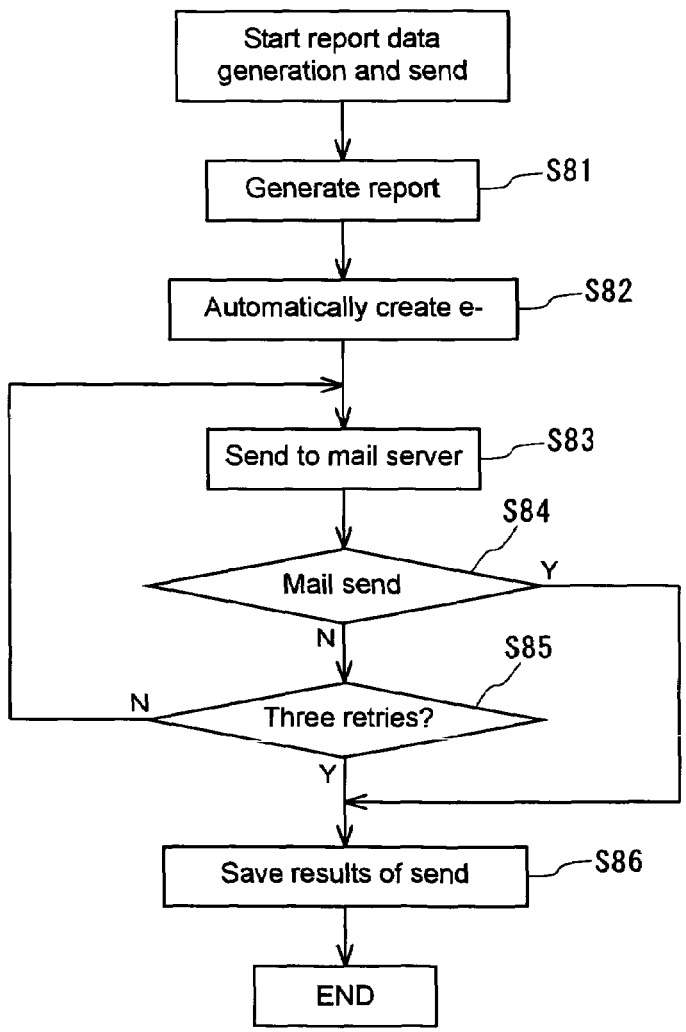
FIG. 21 is a flowchart illustrating a processing procedure in an informational report generation/transmission processor involving the other embodiment of the present invention.

Specifically, the informational-report generation/transmission processor 41 is constituted such that it checks to see if it is the preset time to start processing (e.g., the beginning of the week or the beginning of the month), and then sequentially executes the process illustrated in FIG. 21. First, based on the operational status data for the NC machine tools 15 stored in the operational status database 22, informational report that summarizes the operational status of the NC machine tools 15 over the predetermined time period (e.g., one week or one month) is automatically generated (Step S81).

Figure 17:
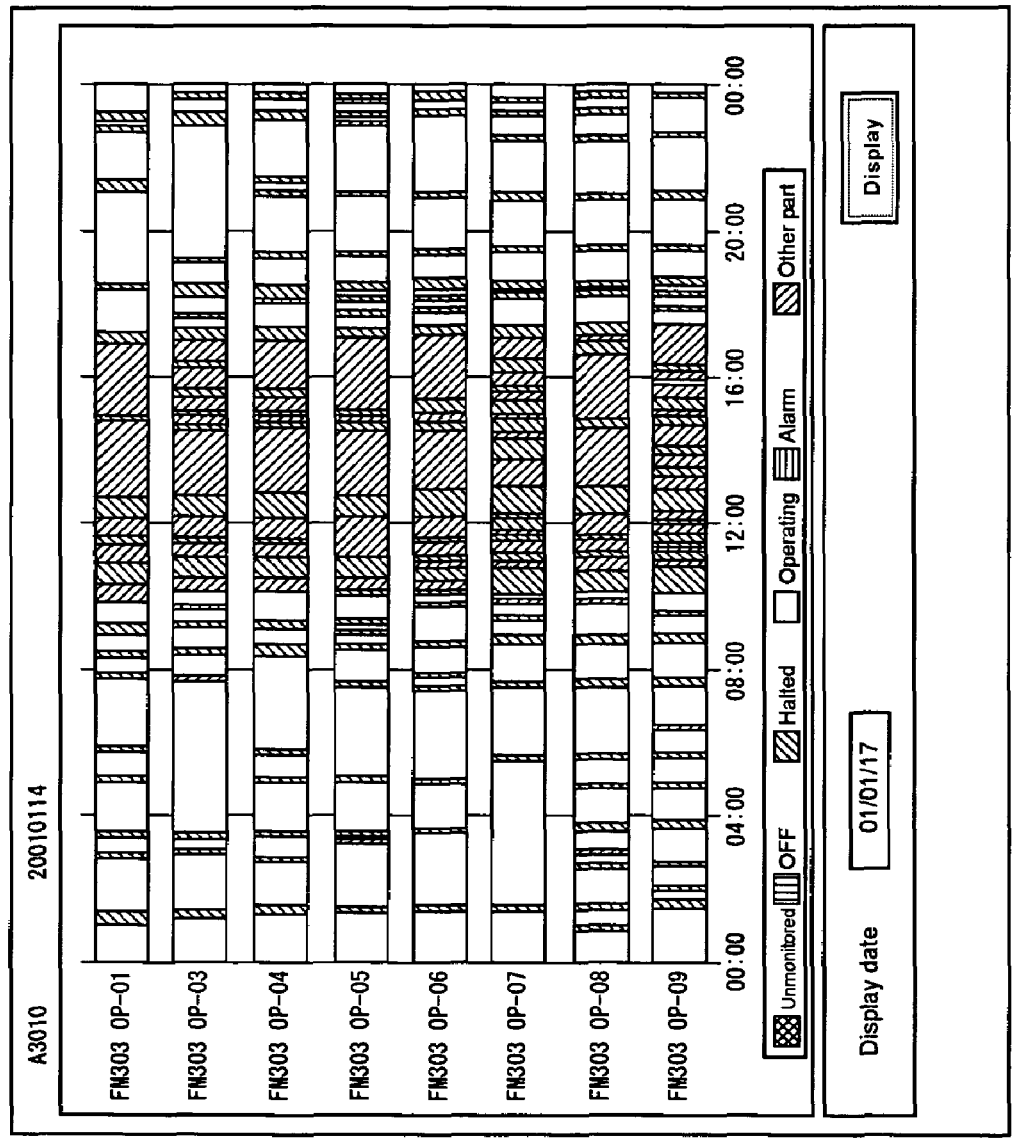
Figure 19:
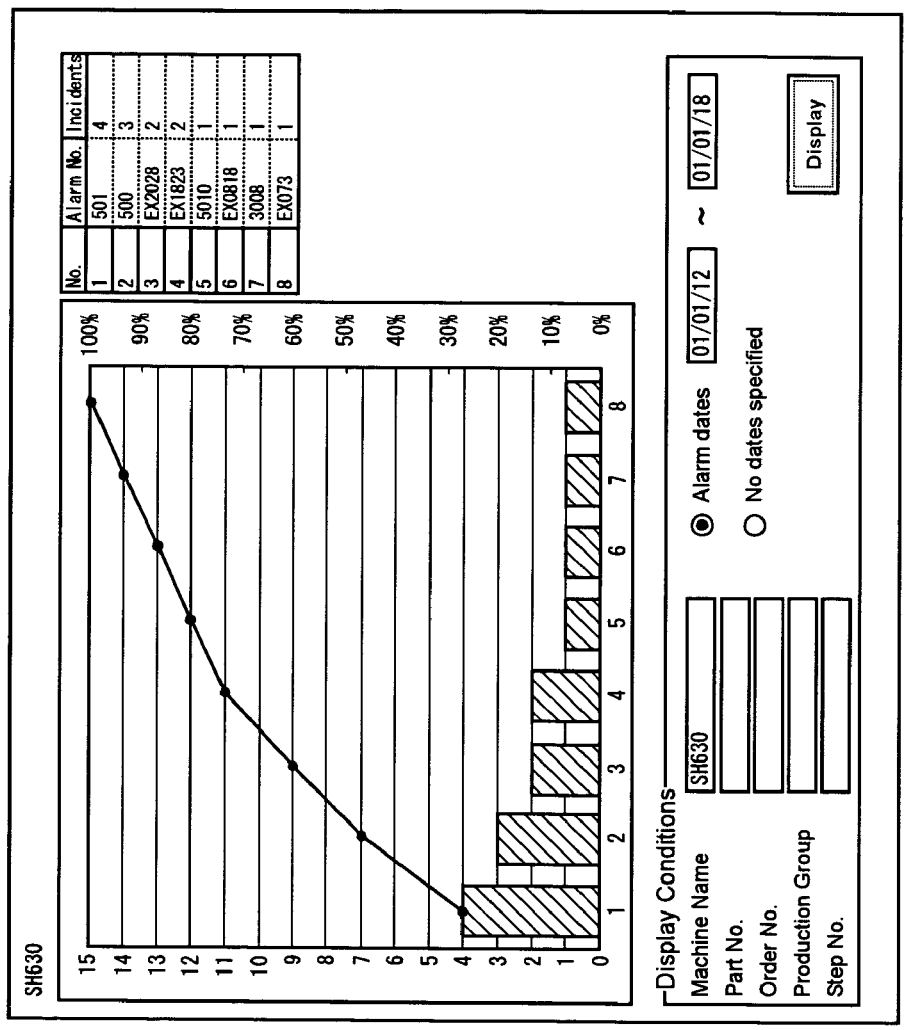

Note that specific examples of this informational report include, in the same manner as the Web pages described above, one that illustrates the operating state of various NC machine tools 15 as a graph as shown in FIG. 17, one that presents the alarm log for the NC machine tools 15 as a list as shown in FIG. 18, a Pareto chart of the frequency of occurrence of various alarms as shown in FIG. 19, as well as lists that present the operating log of the various NC machine tools 15.

In addition, in this informational-report generation/transmission process, such details as when the process is to be executed, the time period over which the informational report is to be generated, which NC machine tools 15 will be included in the informational report to be generated, or what type of informational report is to be generated can be preset as suitable for each user to match the needs of the user.

Accordingly, the administration device 40 is provided with an appropriate storage unit (not shown) that stores setting data such as that given above along with the e-mail address of the user who is the destination for the informational report, so the informational-report generation/transmission processor 41 executes the generation and transmission process based on the data stored in this storage unit.

Next, in Step S82, an e-mail message for sending the informational report generated in Step S81 is generated automatically. As above, this e-mail message comprises a header portion and an e-mail body portion, and the informational report is attached to this e-mail as a file attachment.

Next, a connection to the Internet 5 is established and the e-mail message thus generated is sent to the specified mail server, or namely the terminal device 50 (Step S83). Note that in this example, the e-mail message is first sent to mail server 28 and then forwarded from this mail server 28 to a mail server corresponding to the specified e-mail address, mail server 14 in this example.

Next, a check as to whether or not the mail send was successful is made and if successful, control advances to Step S86 (Step S84), but if the send failed, three attempts to resend are made (Step S85) and control advances to Step S86. Then in Step S86, the results of the mail send are appropriately stored in the storage unit and then the Internet 5 is disconnected and then the process is ended. Based on the send results thus stored, the manufacturer can determine whether or not the informational report was sent to the side of the user without incident, and can ultimately take appropriate action in the event that the send failed.

The terminal device 50 (not shown) has a constitution comprising: a mail reception processor, a received data storage unit, a keyboard, a mouse or other input devices, a CRT or other display device, and a printer or other printing device.

The received data storage unit is a functional unit that stores e-mail sent from the administration device 40 and the mail reception processor performs the process of receiving e-mail sent from the administration device 40 and storing it in the received data storage unit.

Specifically, the mail reception processor is constituted such that it receives input signals that are input appropriately from the input device and starts a series of processes. First, it connects to the mail server 14 and if the connection is successful, it gets the mail from the mail server 14 and then performs the process of deleting mail within the mail server 14, and thereafter stores the received mail in the received data storage unit and ends this process.

On the other hand, if the connection to the mail server 14 failed, it tries to connect three times and if the connection was not successful all three times, an error message to that effect is displayed on the screen of the display device and this process is ended.

Moreover, the informational report attached to the e-mail message stored in the received data storage unit may be displayed on the screen of the display device or output from the printer in response to input from the input device.

With the operational administration system provided with an administration device 40 and terminal device 50 constituted as described above, the operational status data for the NC machine tools 15 is gathered and stored by the operational data storage/transmission devices 10, and sent to the administration device 40 when the predetermined transmission conditions are met. Then, the operational status data stored in the operational status database 22 is updated by the e-mail receiving/data updating processor 21 of the administration device 40.

Moreover, based on the operation situation data for the NC machine tools 15 stored in the operational status database 22, the informational-report generation/transmission processor 41 regularly or irregularly generates informational report that summarizes the operational status of the various NC machine tools 15 within a predetermined time period, and sends the informational report thus generated as an e-mail attachment via the mail servers 28 and 14 to the terminal device 50.

The e-mail message thus sent is received by the mail reception processor of the terminal device 50 and stored in the received data storage unit. Moreover, the informational report attached to the e-mail message stored in the received data storage unit may be displayed on the screen of a display device or output from a printer.

Thereby, each user can determine the operational status of each NC machine tool 15 based on the informational report that is automatically compiled and sent by the administration device 40, and can administrate this information centrally, so the same meritorious effects as above can be obtained. In addition, in order to determine the operational status for each machine tool 15, there is no need for the users themselves to create informational report as is conventionally required, so this is more efficient.

In addition, the informational report generated by the administration device 40 can be sent from this administration device 40 to the terminal device 50 regardless of where the administration device 40 and terminal device 50 are installed. In addition, the administration device 40 is constituted such that it connects to the Internet 5 only at the time of sending e-mail, so safety with respect to unauthorized access and computer viruses can be greatly improved.

In addition, the embodiment above presented an example of sending the operational status data and informational report as e-mail via the mail servers 14 and 28, but the present invention is in no way limited thereto, but rather FTP (File Transfer Protocol), TFTP (Trivial FTP) or HTTP (Hyper Text Transfer Protocol) or other file transfer means may also be used.

In addition, in the embodiments above, the operational data storage/transmission devices 10 are provided separate from the NC device 16, but this is not a limitation, as functions equivalent to the operational data storage/transmission devices 10 may also be incorporated within the NC device 16 as a unit.

In addition, the configuration is such that operational data storage/transmission devices 10 are provided on a one-to-one basis with the NC device 16, but this is not a limitation, as the respective NC devices 16 of a plurality of NC machine tools 15 may also be connected to one single operational data storage/transmission device 10.

In addition, each of the administration devices 20 and 40 may comprise a plurality of computers, with one data-storage computer used exclusively for receiving and storing data from the operational data storage/transmission devices 10, and another data-sending computer used exclusively for receiving requests from the terminal device 30 and sending the requested data to the terminal device 30 or generating informational report and sending it to the terminal device 50.

INDUSTRIAL APPLICABILITY

As described above, the operational administration system according to the present invention is suitable for use in administrating the operational status of NC machine tools.

The invention claimed is:

1. An operational administration system furnished with one or more operational data storage/transmission devices connected to each of numerical controllers for one or more machine tools furnished with the numerical controllers, a terminal device provided where users use the machine tools, and an administration device provided where a manufacturer manufactures the machine tools, said administration device, said operational data storage/transmission devices, and said terminal device being provided to enable connection to one another via the Internet; wherein:

said operational data storage/transmission devices comprise operational data storage means for storing data pertaining to operational status of the machine tools, and data gathering/transmission means for gathering from the numerical controllers data pertaining to the operational status of the machine tools, storing the data in said operational data storage means, and for checking whether a preset transmission condition is met, and only in instances in which the transmission condition is met, sending to said administration device in an e-mail data format the machine-tool operational status data stored in said operational data storage means; and said administration device comprises a database for storing machine-tool operational status data received from the operational data storage/ transmission devices, data receiving/updating means for receiving machine-tool operational status data sent from said operational data storage/transmission devices, and respectively updating, with the operational status data received, the database-stored operational status data on each machine tool, ID data storage means for storing user ID information preestablished for each of the users in order to identify the users, correlatively with machine tool data for identifying the machine tools used by the users, and data transmission means, being a processor for transmitting to the terminal device operational status data stored in said database, for receiving user ID information entered through said terminal device, and for searching said ID data storage means based on the received user-ID information, checking whether the received user-ID information is stored in said ID data storage means, and only in instances in which the received user-ID information is stored, sending, in response to requests from said terminal device, to the requesting terminal device the operational status data for the machine tools identified by the machine tool data stored in said ID data storage means correlatively with the received user-ID information.

2. An operational administration system furnished with one or more operational data storage/transmission devices connected to each of numerical controllers for one or more machine tools furnished with the numerical controllers, a terminal device provided where users use the machine tools, and an administration device provided where a manufacturer manufactures the machine tools, said administration device, said operational data storage/transmission devices, and said terminal device being provided to enable connection to one another via the Internet; wherein:

said operational data storage/transmission devices comprise operational data storage means for storing data pertaining to operational status of the machine tools, and data gathering/transmission means for gathering from the numerical controllers data pertaining to the operational status of the machine tools, storing the data in said operational data storage means, and for checking whether a preset transmission condition is met, and only in instances in which the transmission condition is met, based on the machine-tool operational status data stored in the operational data storage means, generating transmission data of a structure in which data element identifiers defining items involving the operational status of the machine tools are correlated with the operational status data corresponding to the items, and sending to said administration device the generated transmission data; and said administration device comprises a database for storing machine-tool operational status data received from the operational data storage/transmission devices, data receiving/updating means for receiving the transmission data sent from said operational data storage/transmission devices, and for analyzing the data element identifiers in the received transmission data, recognizing the items involving the machine-tool operational statuses defined by the data element identifiers, and respectively updating, with the operational status data received, the operational status data, being database-stored data on each machine tool, corresponding to the recognized items, ID data storage means for storing user ID information preestablished for each of the users in order to identify the users, correlatively with machine tool data for identifying the machine tools used by the users, and data transmission means, being a processor for transmitting to the terminal device operational status data stored in said database, for receiving user ID information entered through said terminal device, and for searching said ID data storage means based on the received user-ID information, checking whether the received user-ID information is stored in said ID data storage means, and only in instances in which the received user-ID information is stored, sending, in response to requests from said terminal device, to the requesting terminal device the operational status data for the machine tools identified by the machine tool data stored in said ID data storage means correlatively with the received user-ID information.

3. An operational administration system furnished with one or more operational data storage/transmission devices connected to each of numerical controllers for one or more machine tools furnished with the numerical controllers, a terminal device provided where users use the machine tools, and an administration device provided for manufacturers who manufacture the machine tools, said administration device, said operational data storage/transmission devices, and said terminal device being provided to enable connection to one another via the Internet; wherein:

said operational data storage/transmission devices comprise operational data storage means for storing data pertaining to operational status of the machine tools, and data gathering/transmission means for gathering from the numerical controllers data pertaining to the operational status of the machine tools, storing the data in said operational data storage means, and for checking whether a preset transmission condition is met, and only in instances in which the transmission condition is met, sending to said administration device in an e-mail data format the machine-tool operational status data stored in said operational data storage means; and said administration device comprises a database for storing machine-tool operational status data received from the operational data storage/transmission devices, data receiving/updating means for receiving machine-tool operational status data sent from said operational data storage/transmission devices, and respectively updating, with the operational status data received, the database-stored operational status data on each machine tool, and informational-report generation/transmission means for generating, based on the machine-tool operational status data stored in said database, informational reports, at fixed or unfixed intervals, compiling the machine-tool operational statuses during a predetermined term, and sending to said terminal device the generated informational reports; wherein said terminal device are configured to receive the informational reports sent from said administration device, and to store the received informational reports.

4. An operational administration system furnished with one or more operational data storage/transmission devices connected to each of numerical controllers for one or more machine tools furnished with the numerical controllers, a terminal device provided where users use the machine tools, and an administration device provided where a manufacturer manufactures the machine tools, said administration device, said operational data storage/transmission devices, and said terminal device being provided to enable connection to one another via the Internet; wherein:

said operational data storage/transmission devices comprise operational data storage means for storing data pertaining to operational status of the machine tools, and data gathering/transmission means for gathering from the numerical controllers data pertaining to the operational status of the machine tools, storing the data in said operational data storage means, and for checking whether a preset transmission condition is met, and only in instances in which the transmission condition is met, based on the machine-tool operational status data stored in the operational data storage means, generating transmission data of a structure in which data element identifiers defining items involving the operational status of the machine tools are correlated with the operational status data corresponding to the items, and sending to said administration device the generated transmission data; and said administration device comprises a database for storing machine-tool operational status data received from the operational data storage/transmission devices, data receiving/updating means for receiving the transmission data sent from said operational data storage/transmission devices, and for analyzing the data element identifiers in the received transmission data, recognizing the items involving the machine-tool operational statuses defined by the data element identifiers, and respectively updating, with the operational status data received, the operational status data, being database-stored data on each machine tool, corresponding to the recognized items, and informational-report generation/transmission means for generating, based on the machine-tool operational status data stored in said database, informational reports, at fixed or unfixed intervals, compiling the machine-tool operational statuses during a predetermined term, and sending to said terminal device the generated informational reports; wherein said terminal device are configured to receive the informational reports sent from said administration device, and to store the received informational reports.

5. An operational administration system according to claim 3 or claim 4, wherein said informational-report generation/transmission means is configured to attach the generated informational reports to e-mail and send to said terminal device the e-mail with the reports attached.

6. An operational administration system according to any of claims 1 through 4, wherein said data gathering/transmission means is configured so that only when sending the operational status data stored in said operational data storage means, said data gathering/transmission means connects to the Internet and sends the operational status data to said administration device, and after the transmission is complete, disconnects from the Internet.

7. An operational administration system according to any of claims 1 through 4, wherein:

said transmission condition is a parameter set with respect to the volume of data stored in said operational data storage means; and said data gathering/transmission means is configured to compare the volume of data stored in said operational data storage means with a reference data volume as the transmission condition, and when the stored data volume has reached the reference data volume, send to said administration device the operational status data stored in said operational data storage means.

8. An operational administration system according to any of claims 1 through 4, wherein:

said transmission condition is a parameter set with respect to the time period that the data gathering requires; and said data gathering/transmission means is configured to compare the time period required for the data gathering with a reference time period as the transmission condition, and when the data-gathering time period has exceeded the reference time period, send to said administration device the operational status data stored in said operational data storage means.

* * * * *